US007483079B2

(12) United States Patent
Kondo et al.

(10) Patent No.: US 7,483,079 B2
(45) Date of Patent: Jan. 27, 2009

(54) SIGNAL PROCESSING APPARATUS, SIGNAL PROCESSING METHOD, STORAGE MEDIUM, AND PROGRAM

(75) Inventors: Tetsujiro Kondo, Tokyo (JP); Yasuhiko Suga, Kanagawa (JP)

(73) Assignee: Sony Corporation, Tokyo (JP)

( * ) Notice: Subject to any disclaimer, the term of this patent is extended or adjusted under 35 U.S.C. 154(b) by 842 days.

(21) Appl. No.: 10/995,666

(22) Filed: Nov. 23, 2004

(65) Prior Publication Data

US 2005/0134942 A1    Jun. 23, 2005

(30) Foreign Application Priority Data

Nov. 27, 2003    (JP) .............................. 2003-397191

(51) Int. Cl.
*H04N 11/20* (2006.01)
(52) U.S. Cl. ...................... 348/458; 348/441; 348/459; 386/46
(58) Field of Classification Search ................. 348/441, 348/445, 446, 448, 451–452, 458–459; 386/1, 386/46; 382/298–300, 250–252, 237, 260; 358/479, 1.9; H04N 11/20
See application file for complete search history.

(56) References Cited

U.S. PATENT DOCUMENTS 5,694,484 A * 12/1997 Cottrell et al. .............. 382/167
5,933,537 A * 8/1999 Hajjahmad et al. .......... 382/250
6,763,136 B1 * 7/2004 Sweet ........................ 382/197

OTHER PUBLICATIONS

Patent Abstracts of Japan, Publication No., 2002-196737, Publication Date Jul. 12, 2002.
Patent Abstracts of Japan, Publication No. 05-167991, Publication Date Jul. 2, 1993.

* cited by examiner

*Primary Examiner*—Trang U Tran
(74) *Attorney, Agent, or Firm*—Frommer Lawrence & Haug LLP; William S. Frommer; Thomas F. Presson

(57) ABSTRACT

A system and method in which a sequence of motion images including a scene of interest is zoomed up and displayed smoothly at a specified arbitrary playback speed. Pixel data of taps corresponding to each pixel of interest in each unit of pixel block of an output image signal to be generated is extracted from an input image signal. A class code is determined based on the extracted pixel data. Based on coefficient seed data of the class and spatial parameters, image quality parameters, and a frame phase of the pixel of interest, a coefficient generator generates coefficient data of the class for use in calculation of pixel data of each pixel of interest. A processing circuit calculates pixel data of the pixel of interest in accordance with a prediction equation using tap data corresponding to the pixel of interest, and the coefficient data corresponding to the class code read from a memory.

11 Claims, 17 Drawing Sheets

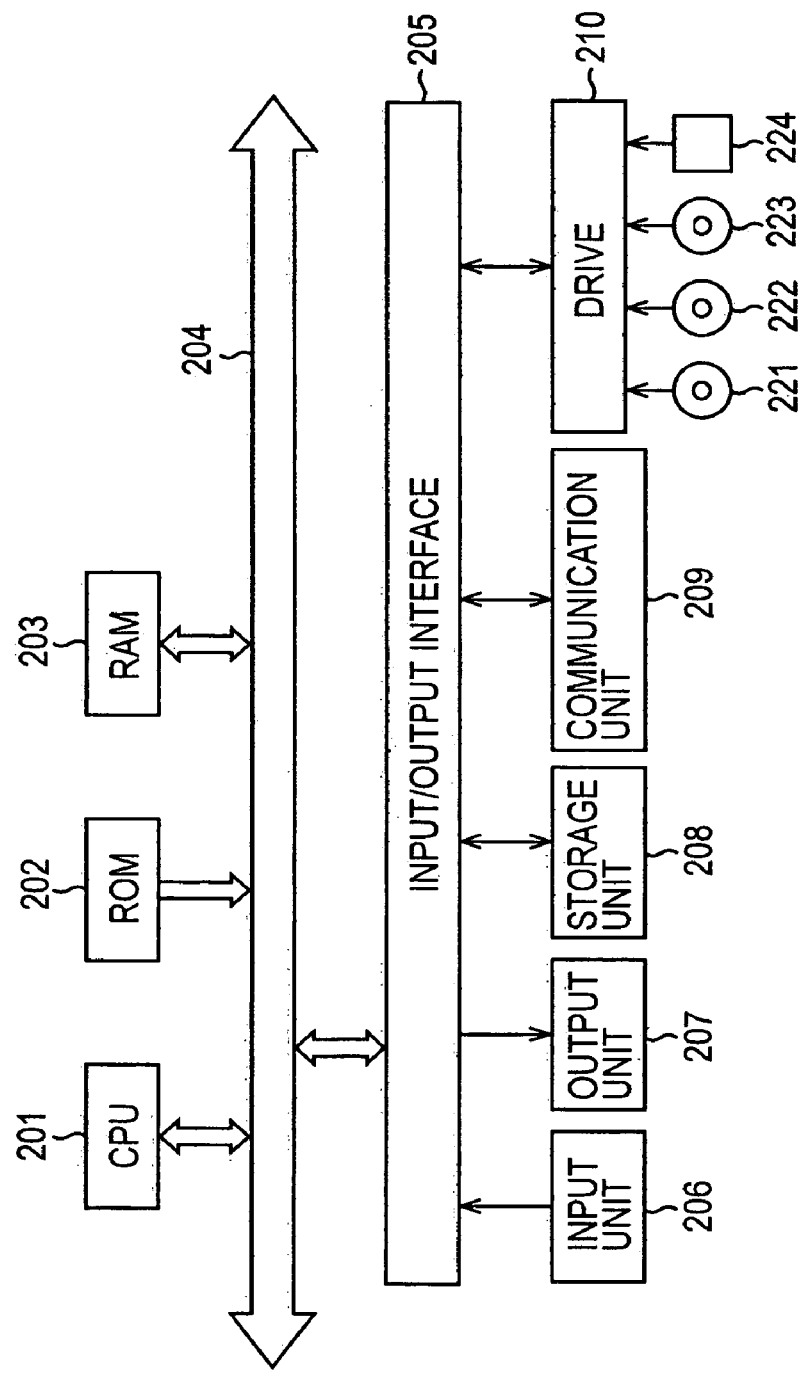

SIGNAL PROCESSING APPARATUS, SIGNAL PROCESSING METHOD, STORAGE MEDIUM, AND PROGRAM

BACKGROUND OF THE INVENTION

1. Field of the Invention

The present invention relates to a signal processing apparatus, a signal processing method, a storage medium, and a program, and more particularity, to a signal processing apparatus, a signal processing method, a storage medium, and a program, capable of smoothly playing back a scene of interest with high image quality.

2. Description of the Related Art

A technique to convert an input image signal to an image signal with higher image quality is becoming popular.

It is known in the art to convert an original input image signal such that a particular area of the original image centered at a point of interest is enlarged or reduced (a specific example of such a technique may be found, for example, in Japanese Unexamined Patent Application Publication No. 2002-196737).

In a case of a moving image signal, a sequence of frames is continuously played back. In such a moving image signal, a scene of interest to a user generally includes not only a particular single frame of interest but a plurality of frames including the particular single frame in a time range. In some cases, a user wants to view a scene of interest in a slow playback mode, in which the scene is played back at a lower speed than a normal playback speed, to view details of the scene.

In the conventional image signal conversion technique, the image signal conversion is simply performed for specified frames. Therefore, although an area centered at a specified point of interest can be enlarged for each frame, each frame is displayed for a longer period in the slow playback mode than is displayed in the normal playback mode, and thus a smooth moving image cannot be obtained in the slow playback mode.

SUMMARY OF THE INVENTION

In view of the above, it is an object of the present invention to provide a technique of playing back a sequence of motion images including a scene of interest such that the image is zoomed up at the center of a point interest and such that the zoomed-up image is displayed with high image quality and is smoothly played back at a specified arbitrary playback speed.

In a aspect, the present invention provides a signal processing apparatus comprising storage means for storing a predetermined number of newest frames of a first image signal being input, playback speed setting means for setting a playback speed of the first image signal stored in the storage means, frame phase calculation means for calculating a frame phase of a second image signal relative to the first image signal, based on the playback speed, spatial parameter setting means for setting a spatial parameter indicating a spatial phase of the second image signal relative to the first image signal, image quality parameter setting means for setting an image quality parameter indicating the degree of image quality adjustment made on the first image signal to obtain the second image signal, classification means for classifying the second image signal into one of a plurality of classes, depending on a level distribution of the first image signal, tap coefficient output means for outputting, for each class, tap coefficients acquired via learning based on the frame phase, the spatial parameter, and the image quality parameter, and calculation means for determining the second image signal by performing a calculation using the first image signal and the tap coefficients of the class determined by the classification means.

The signal processing apparatus according to the present invention may further comprise range setting means for setting a range of the first image signal stored in the storage means to be converted into the second image signal.

In this signal processing apparatus according to the present invention, the spatial phase may include a horizontal spatial phase and a vertical spatial phase, and the spatial parameter may include a horizontal spatial phase parameter corresponding to the horizontal spatial phase and a vertical spatial phase parameter corresponding to the vertical spatial phase.

In this signal processing apparatus according to the present invention, the image quality may include a sharpness level and a noise level, and the image quality parameters may include a sharpness parameter associated with the sharpness level and a noise parameter associated with the noise level.

In an aspect, the present invention provides a signal processing apparatus for converting a first image signal to a second image signal, comprising a storage unit configured to store a predetermined number of newest frames of the first image signal being input, a playback speed setting unit configured to set a playback speed of the first image signal stored in the storage means, a frame phase calculation unit configured to calculate a frame phase of a second image signal relative to the first image signal, based on the playback speed, a spatial parameter setting unit configured to set a spatial parameter indicating a spatial phase of the second image signal relative to the first image signal, an image quality parameter setting unit configured to set an image quality parameter indicating the degree of image quality adjustment made on the first image signal to obtain the second image signal, a classification unit configured to classify the second image signal into one of a plurality of classes, depending on a level distribution of the first image signal, a tap coefficient output unit configured to output, for each class, tap coefficients acquired via learning based on the frame phase, the spatial parameter, and the image quality parameter, and a calculation unit configured to determine the second image signal by performing a calculation using the first image signal and the tap coefficient of the class determined by the classification unit.

In an aspect, the present invention provides a signal processing apparatus comprising storage means for storing a predetermined number of newest frames of a first image signal being input, playback speed setting means for setting a playback speed of the first image signal stored in the storage means, frame phase calculation means for calculating a frame phase of a second image signal relative to the first image signal, based on the playback speed, classification means for classifying the second image signal into one of a plurality of classes, depending on a level distribution of the first image signal, tap coefficient output means for outputting, for each class, tap coefficients acquired via learning based on the frame phase, and calculation means for determining the second image signal by performing a calculation using the first image signal and the tap coefficients of the class determined by the classification means.

In an aspect, the present invention provides a signal processing apparatus for converting a first image signal to a second image signal, comprising a storage unit configured to store a predetermined number of newest frames of the first image signal being input, a playback speed setting unit configured to set a playback speed of the first image signal stored in the storage means, a frame phase calculation unit configured to calculate a frame phase of a second image signal relative to the first image signal, based on the playback speed, a classification unit configured to classify the second image signal into one of a plurality of classes, depending on a level distribution of the first image signal, a tap coefficient output unit configured to output, for each class, tap coefficients acquired via learning based on the frame phase, and a calculation unit configured to determine the second image signal by performing a calculation using the first image signal and the tap coefficient of the class determined by the classification unit.

In an aspect, the present invention provides a signal processing method comprising the steps of storing a predetermined number of newest frames of a first image signal being input, setting a playback speed of the first image signal stored in the storage step, calculating a frame phase of a second image signal relative to the first image signal, based on the playback speed, setting a spatial parameter indicating a spatial phase of the second image signal relative to the first image signal, setting an image quality parameter indicating the degree of image quality adjustment made on the first image signal to obtain the second image signal, classifying the second image signal into one of a plurality of classes, depending on a level distribution of the first image signal, outputting, for each class, tap coefficients acquired via learning based on the frame phase, the spatial parameter, and the image quality parameter, and determining the second image signal by performing a calculation using the first image signal and the tap coefficients of the class determined in the classification step.

In an aspect, the present invention provides a signal processing method comprising the steps of storing a predetermined number of newest frames of a first image signal being input setting a playback speed of the first image signal stored in the storage step, calculating a frame phase of a second image signal relative to the first image signal, based on the playback speed, classifying the second image signal into one of a plurality of classes, depending on a level distribution of the first image signal, outputting, for each class, tap coefficients acquired via learning based on the frame phase, and determining the second image signal by performing a calculation using the first image signal and the tap coefficients of the class determined in the classification step.

In an aspect, the present invention provides a storage medium including a program stored therein comprising the steps of storing a predetermined number of newest frames of a first image signal being input setting a playback speed of the first image signal stored in the storage step, calculating a frame phase of a second image signal relative to the first image signal, based on the playback speed, setting a spatial parameter indicating a spatial phase of the second image signal relative to the first image signal, setting an image quality parameter indicating the degree of image quality adjustment made on the first image signal to obtain the second image signal, classifying the second image signal into one of a plurality of classes, depending on a level distribution of the first image signal, outputting, for each class, tap coefficients acquired via learning based on the frame phase, the spatial parameter, and the image quality parameter, and determining the second image signal by performing a calculation using the first image signal and the tap coefficients of the class determined in the classification step.

In an aspect, the present invention provides a storage medium including a program stored therein comprising the steps of storing a predetermined number of newest frames of the first image signal being input, setting a playback speed of the first image signal stored in the storage step, calculating a frame phase of a second image signal relative to the first image signal, based on the playback speed, classifying the second image signal into one of a plurality of classes, depending on a level distribution of the first image signal, outputting, for each class, tap coefficients acquired via learning based on the frame phase, and determining the second image signal by performing a calculation using the first image signal and the tap coefficients of the class determined in the classification step.

In an aspect, the present invention provides a program comprising the steps of storing a predetermined number of newest frames of a first image signal being input, setting a playback speed of the first image signal stored in the storage step, calculating a frame phase of a second image signal relative to the first image signal, based on the playback speed, setting a spatial parameter indicating a spatial phase of the second image signal relative to the first image signal, setting an image quality parameter indicating the degree of image quality adjustment made on the first image signal to obtain the second image signal, classifying the second image signal into one of a plurality of classes, depending on a level distribution of the first image signal, outputting, for each class, tap coefficients acquired via learning based on the frame phase, the spatial parameter, and the image quality parameter, and determining the second image signal by performing a calculation using the first image signal and the tap coefficients of the class determined in the classification step.

In an aspect, the present invention provides a program comprising the steps of storing a predetermined number of newest frames of a first image signal being input, setting a playback speed of the first image signal stored in the storage step, calculating a frame phase of a second image signal relative to the first image signal, based on the playback speed, classifying the second image signal into one of a plurality of classes, depending on a level distribution of the first image signal, outputting, for each class, tap coefficients acquired via learning based on the frame phase, and determining the second image signal by performing a calculation using the first image signal and the tap coefficients of the class determined in the classification step.

In the signal processing apparatus, the signal processing method, and the program according to the present invention, a predetermined number of newest frames of an input first image signal is stored, a playback speed of the first image signal stored in the storage means is set, a frame phase of a second image signal relative to the first image signal is calculated based on the playback speed, a spatial parameter indicating a spatial phase of the second image signal relative to the first image signal is set, an image quality parameter indicating the degree of image quality adjustment made on the first image signal to obtain the second image signal is set, the second image signal is classified into one of a plurality of classes, depending on a level distribution of the first image signal, tap coefficients acquired via learning based on the frame phase, the spatial parameter, and the image quality parameter are output for each class, and the second image signal is determined by performing a calculation using the first image signal and the tap coefficients of the class.

In the signal processing apparatus, the signal processing method, and the program according to the present invention, a predetermined number of newest frames of an input first image signal is stored, a playback speed of the first image signal stored in the storage means is set, a frame phase of a second image signal relative to the first image signal is calculated based on the playback speed, the second image signal is classified into one of a plurality of classes, depending on a level distribution of the first image signal, tap coefficients acquired via learning based on the frame phase are output for each class, and the second image signal is determined by performing a calculation using the first image signal and the tap coefficients of the class.

In any aspect of the present invention, the signal processing apparatus may be in a form of an independent apparatus or a block.

According to the present invention, a sequence of motion images including a scene of interest can be played back such that the image is zoomed in at the center of a point interest. The zoomed-in image can be displayed with high image quality and can be smoothly played back at a specified arbitrary playback speed.

BRIEF DESCRIPTION OF THE DRAWINGS

FIG. 17 is a diagram showing storage media.

DESCRIPTION OF THE PREFERRED EMBODIMENTS

Figure 1:
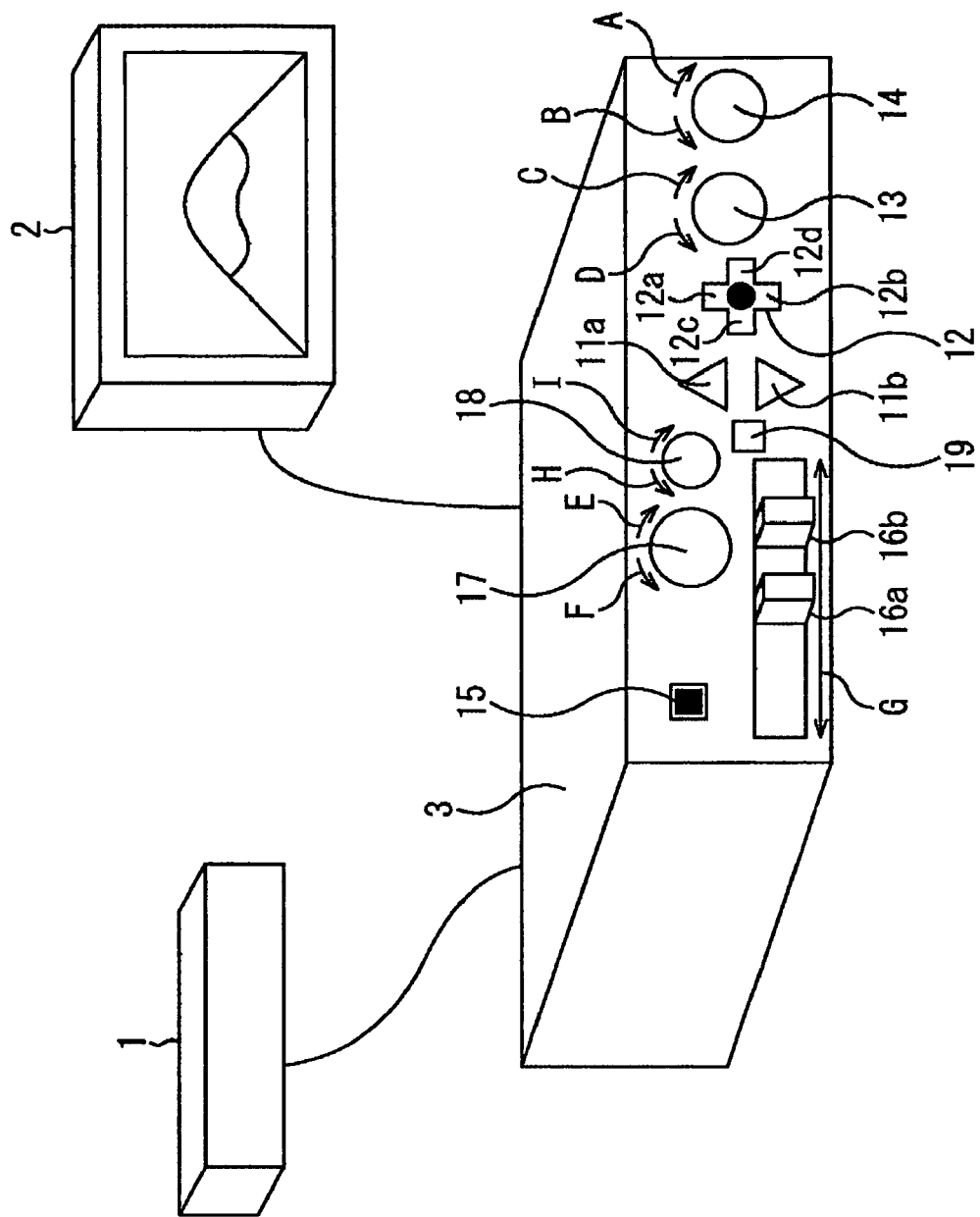
FIG. 1 is a diagram showing an image processing system according to an embodiment of the present invention.

FIG. 1 is a diagram showing an image processing system according to an embodiment of the present invention.

A television signal receiving apparatus 1 receives a broadcast signal transmitted from a broadcast station (not shown), converts the received broadcast signal into an image signal, and supplies the resultant image signal to a system controller 3. The system controller 3 performs various processes on the image signal received from the television signal receiving apparatus 1 and displays the resultant image signal on a display 2.

The system controller 3 includes a signal processing unit 120 (FIG. 2) that performs processing on the image signal, based on parameters specified via control buttons or knobs, which are described in detail below.

Buttons 11a and 11b are for setting a zoom ratio. More specifically, the button 11a is used to increase the zoom ration, and the button 11b is used to reduce the zoom ration.

A button 12 is for setting a point of interest in an image signal such that the point of interest is displayed at the center of a screen. More specifically, a point of interest of an image being displayed is moved upward, downward, leftward, or rightward by pressing buttons 12a, 12b, 12c, or 12d.

A control knob 13 is for adjusting a noise reduction level. If the control knob 13 is turned in a direction denoted by an arrow D, the noise reduction level is reduced. On the other hand, if the control knob 13 is turned in a direction denoted by an arrow C, the noise reduction level is increased.

A control knob 14 is for adjusting a sharpness level. If the control knob 14 is turned in a direction denoted by an arrow B, the sharpness level is reduced. On the contrary, if the control knob 14 is turned in a direction denoted by an arrow denoted by an arrow A, the sharpness level is increased.

A button 15 is a stop button. If this button is pressed, writing of an image signal into an image memory 121 is stopped, and the operation is switched into a mode in which the image signal stored in the image memory 121 is read and processed, and the resultant image signal is displayed on the display 2. If the button 15 is pressed again, writing of the image signal into the image memory 121 is restarted, and the image signal received from the television signal receiving apparatus 1 is supplied to following parts. That is, in the signal processing unit 120 (FIG. 2) of the system controller 3, the image signal supplied from the television signal receiving apparatus 1 is sequentially written in the image memory 121 disposed in the signal processing unit 120, and an oldest frame of the image signal stored in the image memory 121 is deleted such that the image memory 121 always has a newest 30-sec image signal (900 frames of image signal when the frame rate is equal to 30 frames/sec).

Control knobs 16a and 16b are slidable in both directions denoted by an arrow G. The control knob 16a is used to specify a playback start point of the image signal stored in the image memory 121, and the control knob 16b is used to specify a playback end point of the image signal stored in the image memory 121. The right-hand end of the range within which the control knobs 16 are slidable points to a frame of the image signal stored just when the button 15 is pressed, and the left-hand end of the range points to a frame stored 30 sec before the time at which the button 15 is pressed. If the button 15 is pressed, the image signal is played back from the frame specified by the control knob 16a to the frame specified by the control knob 16b.

A control knob 17 is for setting a playback speed. If the control knob 17 is turned in a direction denoted by an arrow E, the playback speed at which the image signal is played back is increased. On the contrary, if the control knob 17 is turned in a direction denoted by an arrow F, the playback speed is reduced.

A control knob 18 is for tuning a receiving frequency. The receiving frequency of a tuner 112 (FIG. 2), which will be described later, is changed in response to turning of the control knob 18 in a direction denoted by an arrow H or in an opposite direction denoted by an arrow I. A button 19 is for specifying a conversion mode in which the image signal is converted. Each time the button 19 is pressed, the conversion mode is sequentially switched in a predetermined order. If the button 19 is pressed after the conversion mode is switched to a last choice, the conversion mode is returned to a first choice.

Figure 2:
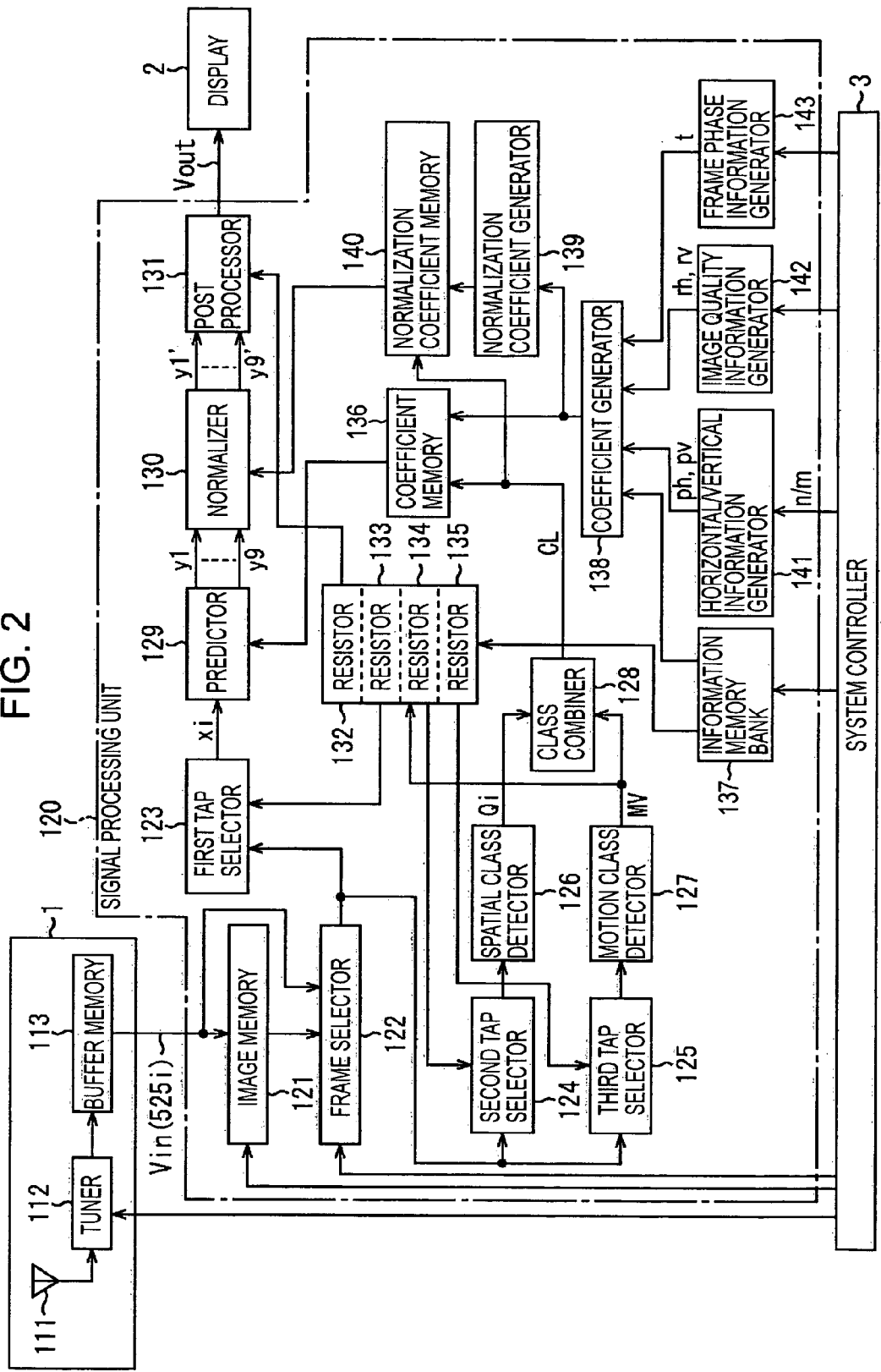
FIG. 2 is a block diagram showing a structure of a signal processing unit disposed in a system controller shown in FIG. 1.

The information associated with settings performed via the above-described buttons and/or control knobs of the system controller 3 is supplied to the signal processing unit 120 shown in FIG. 2, and the signal processing unit 120 processes the image signal directly based on the information or based on parameters indicated by the information.

Referring to FIG. 2, the television signal receiving apparatus 1 and the signal processing unit 120 are described in further detail below.

The television signal receiving apparatus 1 includes a receiving antenna 111, the tuner 112, and a buffer memory 113. A modulated radio-frequency (RF) signal captured by the receiving antenna 111 is supplied to the tuner 112. The tuner 112 selects a channel and further performs intermediate-frequency amplification and detection to obtain a 525i signal. The 525i signal output from the tuner 112 is temporarily stored in the buffer memory 113.

If the signal processing unit 120 receives the 525i signal as an image signal Vin from the buffer memory 113, the signal processing unit 120 converts the received image signal into a 1080i signal or an XGA (extended Graphics Array) (1024× 768 pixels)) signal, or converts the received 525i signal into a new 525i signal representing a zoomed-up image. If the button 15 is pressed, the signal processing unit 120 processes the image signal depending on the positions of the control knobs 16a, 16b, and 17 such that the image signal stored in the image memory 121 is played back from the specified start frame to the specified end frame at the specified playback speed. To this end, the signal processing unit 120 adjusts the number of frames (that is, the signal processing unit 120 generates frames by means of interpolation when it is necessary to increase the number of frames or partially discards existing frames when it is necessary to reduce the number of frames) such that the image signal is displayed smoothly at any specified playback speed.

The image memory 121 of the signal processing unit 120 sequentially stores newest frames of the 525i image signal with a length of 30 sec received from the buffer memory 113. More specifically, after the image memory 121 has stored frames of the image signal with a length of 30 sec, each time the image memory 121 stores a new frame of the image signal, the image memory 121 deletes an oldest frame of the image signal stored therein.

In a normal operation mode, a frame selector 122 supplies each frame of the image signal received from the buffer memory 113 to first to third tap selectors 123 to 125. However, if the stop button 15 is pressed, the frame selector 122 stops storing of the image signal into the image memory 121, and the frame selector 122 reads the image signal from the image memory 121 starting from a frame specified by the control knob 16a and ending at a frame specified by the control knob 16b. The image signal read from the image memory 121 is supplied to the first to third tap selectors 123 to 125.

The first tap selector 123 selectively extracts data of pixels to be used for prediction (hereinafter, such pixels will be referred to as "prediction taps"). The second tap selector 124 selectively extracts data of pixels to be used for spatial classification (hereinafter, such pixels will be referred to as "spatial class taps"). The third tap selector 125 selectively extracts data of pixels to be used for motion classification (hereinafter, such pixels will be referred to as "motion class taps"). Note that in a case in which a spatial class is determined on the basis of data of pixels in a plurality of fields, the spatial class also includes motion information.

The spatial class detector 126 detects a level distribution pattern of data of spatial class taps selectively extracted by the second tap selector 124. The spatial class detector 126 then determines a spatial class on the basis of the detected level distribution pattern and outputs class information indicating the spatial class.

More specifically, the spatial class detector 126 compresses spatial class tap data, for example, from 8-bit data into 1-bit or 2-bit data and outputs, as spatial class information, the resultant compressed data corresponding to each spatial class tap data. In the following description, it is assumed that the spatial class detector 126 performs data compression using an ADRC (Adaptive Dynamic Range Coding) technique. Note that the technique of data compression is not limited to the ADRC but other data compression techniques based on, for example, DPCM (predictive coding) or VQ (vector quantization) may also be employed.

The ADRC technique is a coding technique based on adaptive requantization, which has been originally developed for use in VTRs (Video Tape Recorders). The ADRC technique can represent a local pattern of a signal level in an efficient manner using short-length-word data, and thus the ADRC technique is suitable for use in the data compression. In the case in which the ADRC technique is used, if the maximum and minimum values of the spatial class tap data are denoted by MAX and MIN, respectively, the dynamic range of the spatial class tap data by DR (=MAX−MIN+1), and the number of bits of requantized data by P, then a requantized code $Q_i$ can be determined in the form of compressed data for each pixel data $k_i$ of the extracted spatial class tap data, in accordance with equation (1).

$$Q_i = [(k_i - \text{MIN} + 0.5) \times (2^P/DR)] \tag{1}$$

In equation (1), [0] denotes a rounding-down operation. In a case in which the number of pixel data included in spatial class tap data is equal to Na, i in equation (1) takes values of 1, 2, 3, . . . , Na.

The motion class detector 127 detects a motion class, chiefly indicating the degree of motion, from the data of motion class taps selectively extracted by the third tap selector 125, and outputs class information indicating the determined motion class.

The motion class detector 127 calculates interframe differences from the motion class tap data selectively extracted by the third tap selector 125. Furthermore, motion class detector 127 determines the motion class, which is a measure of motion, by thresholding the mean value of absolute values of differences. More specifically, the motion class detector 127 calculates the mean value AV of absolute values of differences in accordance with equation (2). For example, in the case in which the third tap selector 125 extracts six pixel data $m_1$ to $m_6$ of a current frame as motion class tap data for a pixel of interest and also extracts six pixel data $n_1$ to $n_6$ of an immediately previous frame, Nb in equation (2) is 6, wherein Nb is the number of selected motion class taps used to determine the motion class.

$$AV = \frac{\sum_{i=1}^{Nb} |mi - ni|}{Nb} \tag{2}$$

The motion class detector 127 compares the mean value AV calculated in the above-described manner with one or more threshold values, thereby setting class information MV indicating the motion class. For example, in a case in which three threshold values $th_1$, $th_2$ and $th_3$ ($th_1 < th_2 < th_3$) are predetermined, the motion class detector 127 determines the motion class MV by selecting one of four motion classes depending on the mean value AV such that MV=0 when $AV \leq th_1$, MV=1 when $th_1 < AV \leq th_2$, MV=2 when $th_2 < AV \leq th_3$, or MV=3 when $th_3 < AV$.

The class combiner 128 On the basis of the requantized code $Q_i$ output from the spatial class detector 126 as the class information indicating the spatial class and class information MV indicating the motion class output from the motion class detector 127, the class combiner 128 determines a class code CL indicating a class for each pixel (of interest) in each pixel block of an output image signal Vout to be produced.

More specifically, the class combiner 128 calculates the class code CL in accordance with equation (3). In equation (3), Na denotes the number of data of spatial class taps, and P denotes the number of bits of requantized data generated in the ADRC process.

$$CL = \sum_{i=1}^{Na} i(2^P)^i + MV \cdot 2^{PNa} \quad (3)$$

A pose processor 131 operates in an operation mode selected depending on whether a 1080i signal, a XGA signal, or a 525i signal is output as the output image signal Vout. Operation mode designation information designating the operation of the pose processor 131 is stored in a register 132, and the pose processor 131 operates in the operation mode designated by the operation mode designation information supplied from the register 132.

A register 133 stores tap location information indicating locations of prediction taps to be selected by the first tap selector 123. In accordance with the tap location information supplied from the register 133, the first tap selector 123 selects prediction taps and acquires pixel values of pixels selected as the prediction taps. Tap location information is produced such that all selectable pixels are numbered, and numbers indicating specific pixels to be selected are described in the tap location information. This is also true for other tap location information described later.

A register 134 stores tap location information indicating locations of spatial class taps to be selected by the second tap selector 124. In accordance with the tap location information supplied from the register 134, the second tap selector 123 selects spatial class taps.

The register 134 stores tap location information A indicating tap locations for use when motion is relatively small and also stores tap location information B indicating tap locations for use when motion is relatively large. A determination as to whether the tap location information A or B is supplied to the second tap selector 124 is made in accordance with the motion class information MV output from the motion class detector 127.

More specifically, when the motion class is determined to be MV=0 or 1 because there is no motion or motion is small, the tap location information A is supplied to the second tap selector 124. In accordance with the received tap location information A or B, the second tap selector 124 selects spatial class taps located across a plurality of fields. On the other hand, in the case in which the motion class is determined to be MV=2 or 3 because motion is relatively large, the tap location information B is supplied to the second tap selector 124.

The register 133 may store tap location information for use when motion is relatively small and tap location information for use when motion is relatively large, and either one of these two types of tap location information may be supplied to the first tap selector 123 depending on the motion class information MV output from the motion class detector 127.

A register 135 stores tap location information indicating locations of motion class taps to be selected by the third tap selector 125. In accordance with the tap location information supplied from the register 135, the third tap selector 125 selects motion class taps.

A coefficient memory 136 stores coefficient data, for each class, used in a prediction equation used by a predictor 129 that will be described later. The coefficient data is used when a given 525i signal is converted into a 1080i signal or a XGA signal or when a given 525i signal is converted into a new 525i signal representing an image obtained by zooming up the original 525i signal at a specified arbitrary zoom ratio. The coefficient data is also used to produce new frames to be interpolated between existing frames when a greater number of frames are necessary, for example, in the slow playback mode in which the image signal is played back at a playback speed specified via the playback speed control knob. The coefficient memory 136 acquires address information by reading a class code CL output from the class combiner 128, reads coefficient data corresponding to the class code CL, and supplies the read coefficient data to the predictor 129.

In an information memory bank 137, operation mode designation information to be stored in the register 132 and tap location information to be stored in the registers 133 to 135 are stored in advance.

The operation mode designation information stored in the information memory bank 137, for use by the register 132, includes first operation mode designation information designating a first conversion mode in which the pose processor 131 outputs a 1080i signal, second operation mode designation information designating a second conversion mode in which the pose processor 131 outputs a XGA signal, and third operation mode designation information designating a third conversion mode in which the pose processor 131 outputs a 525i signal.

Depending on the operation performed by a user on the button 19 of the system controller 3, the first conversion mode in which a 1080i signal is output, the second conversion mode in which a XGA signal is output, or the third conversion mode in which a 525i signal is output is selected. When the third conversion mode is selected, the user may further select a zoom ratio (image size) at which the image is zoomed up. Selection information indicating the conversion mode is supplied from the system controller 3 to the information memory bank 137, and operation mode designation information designating the first, second or the third conversion mode is loaded from the information memory bank 137 into the register 132 in accordance with the selection information.

In the information memory bank 137, first tap location information for use in the first conversion mode (1080i), second tap location information for use in the second conversion mode (XGA), and third tap location information for use in the third conversion mode (525i) are stored in advance as tap location information associated with prediction taps to be stored in the resistor 133. In accordance with the selection information indicating the conversion mode, the first, second, or third tap location information is loaded from the information memory bank 137 into the register 133.

In the information memory bank 137, tap location information corresponding to zoom ratios at which an image is enlarged may be stored as the third tap location information for use in the third conversion mode such that when the third conversion mode is selected, tap location information corresponding to a specified zoom ratio is also loaded from the information memory bank 137 into the register 133. This also applies to tap location information loaded into the register 134 or 135 described later.

In the information memory bank 137, first tap location information for use in the first conversion mode (1080i), second tap location information for use in the second conversion mode (XGA), and third tap location information for use in the third conversion mode (525i) are also stored in advance as tap location information associated with spatial class taps to be stored in the resistor 134. Each of these first, second, and third tap location information includes tap location information for use when motion is relatively small and tap location information for use when motion is relatively large. In accordance with the selection information indicating the conversion mode, the first, second, or third tap location information is loaded from the information memory bank 137 into the register 134.

Furthermore, in the information memory bank 137, first tap location information for use in the first conversion mode (1080i), second tap location information for use in the second conversion mode (XGA), and third tap location information for use in the third conversion mode (525i) are stored in advance as tap location information associated with motion class taps to be stored in the resistor 135. In accordance with the selection information indicating the conversion mode, the first, second, or third tap location information is loaded from the information memory bank 137 into the register 135.

In the information memory bank 137, coefficient seed data of each class is also stored in advance. The coefficient seed data is used to generate coefficient data to be stored in the coefficient memory 136 such that in accordance with a generation equation including parameters associated with phase information, the coefficient data is generated using the coefficient seed data stored in the information memory bank 137.

The predictor 129 calculates image data y to be generated, in accordance with a prediction equation (4) shown below using prediction tap data $x_i$ and coefficient data $W_i$ read from the coefficient memory 136.

$$y = \sum_{i=1}^{n} W_i \cdot x_i \quad (4)$$

where n denotes the number of prediction taps (for example, 10 taps) selected by the first tap selector 123.

The coefficient data $W_i$ (i=1, 2, 3, ..., n) in the prediction equation (4) is generated according to equation (5) including spatial parameters indicating a spatial phase (ph and pv, which indicates horizontal and vertical positions set by the button 12), parameters associated with image quality adjustment (rh and rv indicating a sharpness level and a noise reduction level set by the control knobs 13 and 14), and a frame phase value (t) (indicating the relative frame position of a frame to be generated with respect to the frame position of an existing frame) wherein the frame phase value is determined based on the playback speed set by the control knob 17).

$$W_1 = w_{100} + w_{101}(pv) + w_{102}(ph) + \quad (5)$$
$$w_{103}(rv) + w_{104}(rh) + w_{105}(t) +$$
$$w_{106}(pv)^2 + w_{107}(ph)^2 + w_{108}(rv)^2 +$$

-continued
$$w_{109}(rh)^2 + w_{110}(t)^2$$
$$W_2 = w_{220} + w_{201}(pv) + w_{202}(ph) +$$
$$w_{203}(rv) + w_{204}(rh) + w_{205}(t) +$$
$$w_{206}(pv)^2 + w_{207}(ph)^2 + w_{208}(rv)^2 +$$
$$w_{209}(rh)^2 + w_{210}(t)^2$$
$$\vdots$$
$$W_i = w_{i00} + w_{i01}(pv) + w_{i02}(ph) +$$
$$w_{i03}(rv) + w_{i04}(rh) + w_{i05}(t) +$$
$$w_{i06}(pv)^2 + w_{i07}(ph)^2 + w_{i08}(rv)^2 +$$
$$w_{i09}(rh)^2 + w_{i10}(t)^2$$
$$\vdots$$
$$W_n = w_{n00} + w_{n01}(pv) + w_{n02}(ph) +$$
$$w_{n03}(rv) + w_{n04}(rh) + w_{n05}(t) +$$
$$w_{n06}(pv)^2 + w_{n07}(ph)^2 + w_{n08}(rv)^2 +$$
$$w_{n09}(rh)^2 + w_{n10}(t)^2$$

Coefficient seed data $W_{100}$ to $W_{n10}$ used as coefficient data used in the generation equation (5) are stored for each class in the information memory bank 137. A method of producing the coefficient seed data will be described later.

Using the coefficient seed data for each class, spatial parameters (ph and pv) indicating a spatial phase, parameters associated with image quality adjustment (rh and rv), and the frame phase value (t) and according to equation (5), a coefficient generator 138 generates coefficient data $W_i$ (i=1, 2, 3, ... n) in the prediction equation corresponding to the spatial parameters (ph and pv) indicating the spatial phase, the parameters associated with image quality adjustment (rh and rv), and the frame phase value (t) indicating a deviation of a frame position of a frame to be generated relative to a position of an existing frame, for each class. To perform the above calculation, coefficient seed data of each class is supplied from the information memory bank 137 to the coefficient generator 138. Furthermore, spatial parameters (ph and pv) which indicate a spatial phase of each pixel in each unit pixel block of an output image signal Vout and which are generated by a horizontal/vertical phase information generator 141 described later, parameters associated with image quality adjustment (rh and rv), and a frame phase value (t) are also supplied to the coefficient generator 138. The coefficient data generated by the coefficient generator 138, that is the coefficient data $W_i$ (i=1, 2, 3, ... n) corresponding to the spatial parameters (ph and pv) indicating the spatial phase, the parameters associated with image quality adjustment (rh and rv), and the time (frame phase value, t) is stored in the coefficient memory 136.

Depending on the conversion mode and the zoom ratio specified via the buttons 11a, 11b, 12a, 12b, 12c, 12d, and 19 of the system controller 3, data indicating the ratio, n/m, of the number of pixels of the output image signal Vout to the number of pixels of the input image signal Vin in each of vertical and horizontal directions is supplied to the horizontal/vertical phase information generator 141. Based on the specified ration n/m, the horizontal/vertical phase information generator 141 generates a horizontal phase parameter and a vertical phase parameter pv of each pixel in each unit pixel block of the output image signal Vout. The horizontal/ vertical phase information generator 141 may be formed, for example, using a table stored in a ROM (Read Only Memory).

The horizontal phase parameter ph and the vertical phase parameter pv of each pixel generated by the horizontal/vertical phase information generator 141 are respectively supplied together with data indicating the pixel number (tap number) to the coefficient generator 138. Note that the horizontal/vertical phase information generator 141 generates the phase parameters ph and pv for each of odd and even fields of the input image signal Vin.

Figure 3:
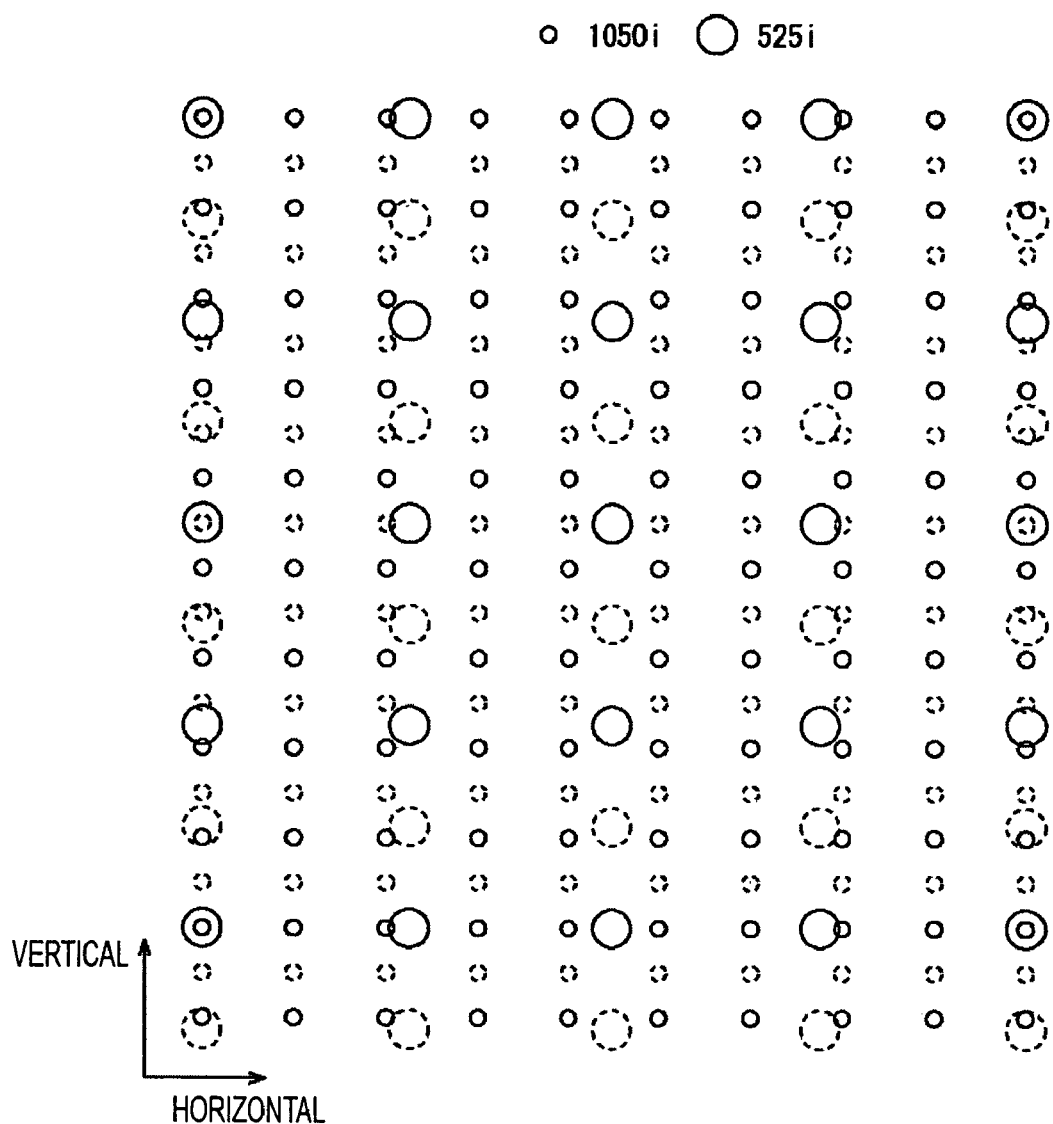
FIG. 3 is a diagram showing a relationship in terms of spatial phase between a SD signal (525i signal) and a HD signal (1080i signal)

For example, in the first conversion mode (in which a 525i image signal is converted into a 1080i image signal), n/m=9/4 in the vertical direction and n/m=9/4 in the horizontal direction, as shown in FIG. 3. FIG. 3 shows locations of pixels of a 525i signal and those of a 1050i signal. In FIG. 3, pixels of the 525i signal are indicated by greater dots, and pixel of the 1080i signal are indicated by smaller dots, wherein solid lines represent pixel locations in an odd field, and dashed lines represent pixel locations in an even field.

Thus, in this case, each 9×9 pixel block of the output 1080i image signal Vout corresponds to a 4×4 pixel block of the input 525i image signal Vin. That is, in this case, an unit pixel block of the output image signal Vout has a size of 9×9 pixels.

In the example shown in FIG. 3, the horizontal/vertical phase information generator 141 determines the vertical phase parameter pv for each pixel of each 9×9 unit pixel block by determining the distance from each pixel to a pixel (vertically closest pixel) closest in the vertical direction in the 4×4 pixel block of the 525i signal and employing the determined distance as the value of the parameter pv. Similarly, the horizontal/vertical phase information generator 141 determines the horizontal phase parameter pv for each pixel of each 9×9 unit pixel block by determining the distance from each pixel to a pixel (horizontally closest pixel) closest in the horizontal direction in the 4×4 pixel block of the 525i signal and employing the determined distance as the value of the parameter ph. In this specific example, the vertical pixel-to-pixel distance of the 525i signal is equal to 16 and the horizontal pixel-to-pixel distance is equal to 8, and the phase parameters ph and pv are calculated by using these values of pixel-to-pixel distances. This also applies to the second and the third conversion mode.

The sign of the phase parameter pv is defined such that the phase parameter pv is negative when a pixel of interest in a 9×9 unit pixel block is located above a corresponding vertically closest pixel, and the phase parameter pv is positive when a pixel of interest in a 9×9 unit pixel block is located below a corresponding vertically closest pixel. Similarly, the sign of the phase parameter ph is defined such that the phase parameter pv is negative when a pixel of interest in a 9×9 unit pixel block is located to the left of a corresponding horizontally closest pixel, and the phase parameter pv is positive when a pixel of interest in a 9×9 unit pixel block is located to the right of a corresponding horizontally closest pixel. This also applies to the second and the third conversion mode.

In the first conversion mode (525i-to-1080i conversion), as described above, the horizontal/vertical phase information generator 141 generates spatial phase parameters ph and pv for each of 81 pixels in each 9×9 unit pixel block for each of odd and even fields.

In the second conversion mode (525i-to-XGA conversion), n/m=16/5 in the vertical direction and n/m=8/5 in the horizontal direction. Thus, in this case, each 8×16 pixel block of the output XGA image signal Vout corresponds to a 5×5 pixel block of the input 525i image signal Vin. That is, in this case, an unit pixel block of the output image signal Vout has a size of 8×16 pixels.

Thus, the horizontal/vertical phase information generator 141 determines the vertical phase parameter pv for each pixel of each 8×16 unit pixel block by determining the distance from each pixel to a pixel (vertically closest pixel) closest in the vertical direction in a 5×5 pixel block of the 525i signal and employing the determined distance as the value of the parameter pv. Similarly, the horizontal/vertical phase information generator 141 determines the horizontal phase parameter pv for each pixel of each 8×16 unit pixel block by determining the distance from each pixel to a pixel (horizontally closest pixel) closest in the horizontal direction in the 5×5 pixel block of the 525i signal and employing the determined distance as the value of the parameter ph.

In the second conversion mode (525i-to-XGA conversion), as described above, the horizontal/vertical phase information generator 141 generates phase parameters ph and pv for each of 128 pixels in each 8×16 unit pixel block for each of odd and even fields.

In the third conversion mode (525i-to-525i conversion), ratios n/m are uniquely determined in the vertical and horizontal directions depending on the specified zoom ratio (image size). For example, when n/m=nv/vm in the vertical direction and n/m=nh/mn in the horizontal direction, an nh×nv pixel block of a 525i output image signal Vout corresponds to an mh×mv pixel block of a 525i input image signal Vin. That is, in this case, an unit pixel block of the output image signal Vout has a size of nh×nv pixels.

Thus, the horizontal/vertical phase information generator 141 determines the vertical phase parameter pv for each pixel of each nh×nv unit pixel block by determining the distance from each pixel to a pixel (vertically closest pixel) closest in the vertical direction in the mh×mv pixel block of an input 525i image signal Vin and employing the determined distance as the value of the parameter pv. Similarly, the horizontal/vertical phase information generator 141 determines the horizontal phase parameter pv for each pixel of each nh×9 nv unit pixel block by determining the distance from each pixel to a pixel (horizontally closest pixel) closest in the horizontal direction in the mh×mv of the input 525i image signal Vin and employing the determined distance as the value of the parameter ph.

In the third conversion mode (525i-to-525i conversion), as described above, the horizontal/vertical phase information generator 141 generates spatial phase parameters ph and pv for each pixel in each nh×nv 9 unit pixel block for each of odd and even fields.

An image quality information generator 142 generates a parameter rh based on a noise reduction level specified by the noise reduction control knob 13 on the system controller 3 and also generates a parameter rv based on a sharpness adjustment level specified by the sharpness adjustment control knob 14 on the system controller 3. The generated parameters rh and rv are supplied to the coefficient generator 138. The image quality information generator 142 may be formed, for example, using a table stored in a ROM (Read Only Memory).

A frame phase information generator 143 generates a frame phase value indicating the relative frame position of a frame to be generated with respect to the frame position of an existing frame, based on a playback speed specified via the playback speed control knob 17 on the system controller 3. The generated frame phase value is supplied to the coefficient generator 138. The details of the frame phase will be described later.

A normalization factor generator 139 calculates a normalization factor S corresponding to the coefficient data $W_i$ (i=1 to n) generated by the coefficient generator 138 for respective parameters ph and pv of each class in accordance with equation (6).

$$S = \sum_{i=1}^{n} W_i \tag{6}$$

The generated normalization factor S for each class is stored in a normalization factor memory 140. When a class code CL is supplied as read address information from the class combiner 128 to the normalization factor memory 140, the normalization factor memory 140 outputs a normalization factor S corresponding to the class code CL to a normalizer 130 that will be described later.

The predictor 129 calculates pixel values in each unit pixel block of the output image signal Vout based on the prediction tap data $x_i$ selectively output from the first tap selector 123 and also based on the coefficient data $W_i$ read from the coefficient memory 136.

That is, the predictor 129 generates pixel data of the output image signal Vout for each unit pixel block. More specifically, the predictor 129 calculates the pixel value of each pixel in each unit pixel block in accordance with equation (4) using prediction tap data $x_i$ (supplied from the first tap selector 123 corresponding to each pixel (pixel of interest) in each unit pixel block and also using coefficient data $W_i$ (supplied from the coefficient memory 136) corresponding to each pixel in each unit pixel block.

In the first conversion mode (525i-to-1080i conversion), the predictor 129 generates 81 pixel data of each unit pixel block at a time. In the second conversion mode (525i-to-XGA conversion), the predictor 129 generates 128 pixel data of each unit pixel block at a time. In the third conversion mode (525i-to-525i conversion), the predictor 129 generates nh×nv pixel data of each unit pixel block at a time. Note that nh and nv vary depending on the specified zoom ratio of the image to be displayed.

Pixel data $y_1$ to $y_p$ (where p is the number of pixels included in each unit pixel block) of each unit pixel block of the output image signal Vout are sequentially supplied to the normalizer 130. The normalizer 130 reads, from the normalization factor memory 140, a normalization factor S corresponding to the coefficient data $W_i$ (i=1, 2, 3, . . . , n) used to generate the pixel data $y_1$ to $y_p$ and normalizes the pixel data $y_1$ to $y_p$ by dividing them by the normalization factor S. When the coefficient generator 138 determines the coefficient data of the prediction equation in accordance with the generation equation using the coefficient seed data, the resultant coefficient data includes rounding errors, and thus the sum of the coefficient data $W_i$ (i=1, 2, 3, . . . , n) is not necessarily equal to 1.0. As a result, the pixel data $y_1$ to $y_p$ calculated by the predictor 129 have a fluctuation due to the rounding errors. To eliminate such a fluctuation, the normalizer 130 normalizes the pixel data $y_1$ to $y_p$.

From the normalized pixel data $y_1$ to $y_p$ of each unit pixel block sequentially output from the normalizer 130, the pose processor 131 generates the output image signal Vout in a format corresponding to specified one of the first to third conversion mode. More specifically, when the first conversion mode is selected, a 1080i signal is output from the pose processor 131. In the second conversion mode, a XGA signal is output, and a 525i signal is output in the third conversion mode. In the above process, the pose processor 131 determines the conversion mode based on the operation mode designation information supplied from the register 132.

Figure 4:
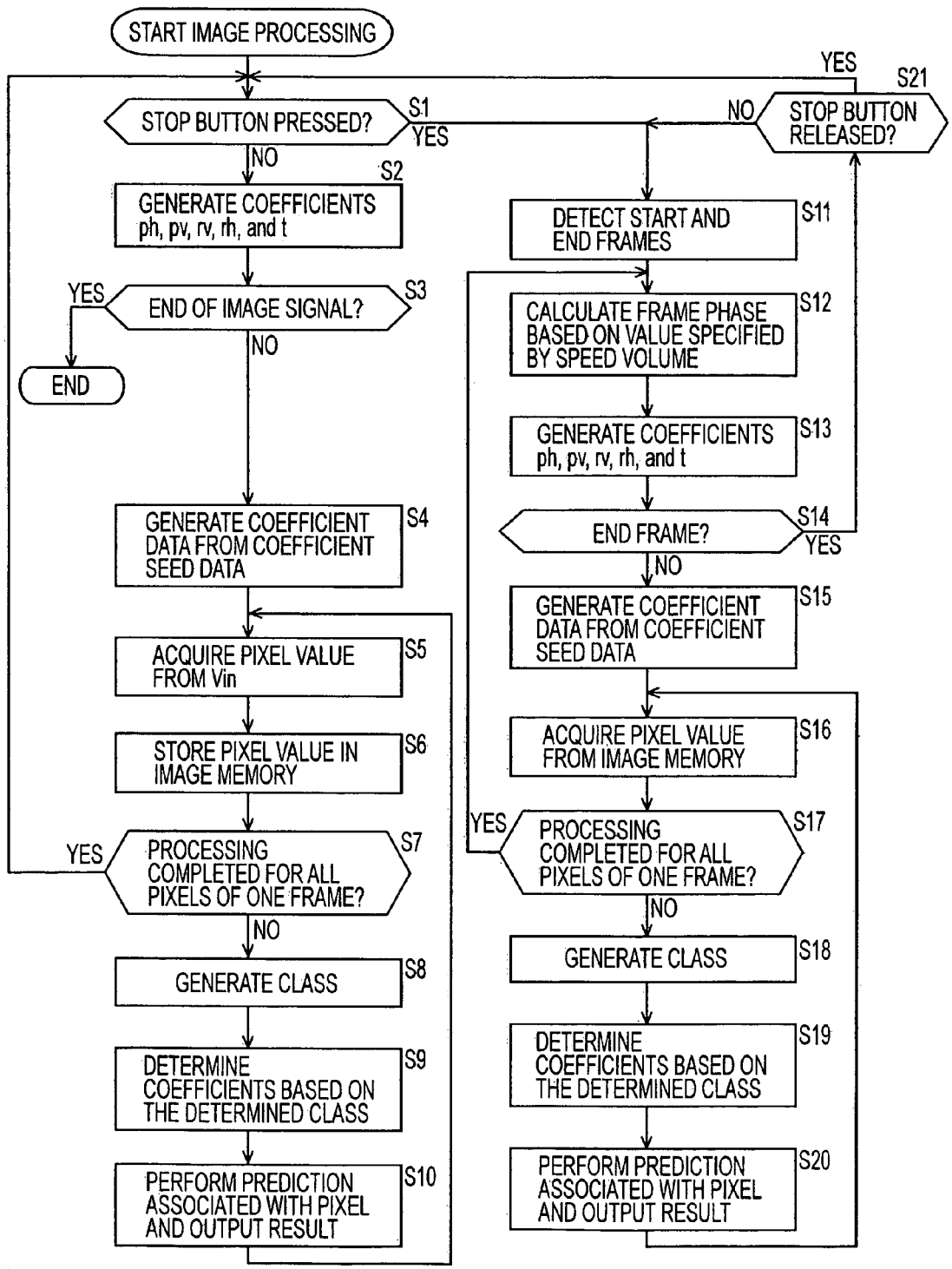
FIG. 4 is a flow chart showing image processing performed by a signal processing unit shown in FIG. 2.

The image processing performed by the signal processing unit 120 is described in further detail with reference to a flow chart shown in FIG. 4.

In step S1, the frame selector 122 determines whether the button 15 is pressed into the stop state. If it is determined that the button 15 is not in the stop state, the process proceeds to step S2.

In step S2, parameters ph, pv, rh, rv, and t are generated. More specifically, the horizontal/vertical phase information generator 141 generates parameter ph and pv depending on the settings performed via the buttons 11a, 11a, 12a and 12b of the system controller 3, and the image quality information generator 142 generates parameters rh and rv depending on the settings performed via the buttons 13 and 14 of the system controller 3. The frame phase information generator 143 generates the parameter t depending on the settings performed via the buttons 16a, 16b, and 17 of the system controller 3. Those parameters generated are supplied to the coefficient generator 138. Note that in the process in step S2, because the button 15 is not in the stop state, no operation control signals are output from the control knobs 16a, 16b, and 17 (the image signal stored in the image memory 121 is not played back), and no frame phase difference occurs (the image is generated using frames supplied from the buffer memory 113 without generating new frames). Thus, in step S2, the frame phase information generator 143 outputs the frame phase value t that is always equal to 0.

In step S3, the frame selector 122 determines whether supplying of the image signal from the buffer memory 122 is ended. If it is determined that the supplying of the image signal is ended, the process is ended. On the other hand, if it is determined that the image signal is still being supplied, the process proceeds to step S4.

In step S4, coefficient data is generated from coefficient seed data. More specifically, the coefficient generator 138 generates, for each class, coefficient data $W_i$ (i=1, 2, 3, . . . , n) used in the prediction equation corresponding to spatial parameters ph and pv (generated by the horizontal/vertical phase information generator 141) of each pixel in each unit pixel block of an output image signal Vout, image quality parameters rh and rv generated by the image quality information generator 142, and the frame phase t. The generated parameters are stored in the coefficient memory 136. The normalization factor generator 139 generates a normalization factor S corresponding to the coefficient data $W_i$ (i=1 to n) generated by the coefficient generator 138 for each class and for each phase information. The generated normalization factor S is stored in the normalization factor memory 140.

In step S5, the frame selector 122 acquires each pixel value of the image signal from the buffer memory 113 and supplies the acquired pixel value to the first to third tap selectors 123 to 125. Thereafter, in step S6, the image memory 121 stores the image signal sequentially supplied from the buffer memory 113 such that the image signal with a newest period of up to 30 sec exists in the image memory 121.

In step S7, the frame selector 122 determines whether processing is completed for all pixels of one frame. If it is determined that processing is not completed for all pixels of one frame the process proceeds to step S8. On the other hand, if it is determined in step S7 that processing is completed for all pixels of one frame, the process returns to step S1.

In step S8, a class code CL is generated. More specifically, the register 134 supplies, to the second tap selector 124, tap location information corresponding to the conversion mode specified by a user and corresponding to the motion class detected by the motion class detector 127. The second tap selector 124 selectively extracts pixel data (to be used as spatial class tap data) of pixels at locations indicated by the location information supplied from the register 134, and supplies the extracted pixel data to the spatial class detector 126. The spatial class detector 126 performs the ADRC processing on each pixel data of the spatial class taps thereby obtaining a requantized code $Q_i$ serving as class information indicating a spatial class (indicating a spatial waveform) in accordance with equation (1). The resultant requantized code $Q_i$ is supplied to the class combiner 128.

The third tap selector 125 selectively extracts data (pixel data) of motion class taps at locations in the vicinity of each pixel (each pixel of interest) in each unit pixel block of the output signal Vout to be produced from the input 525i image signal Vin stored in the buffer memory 113. The extracted data of the motion class taps is supplied to the motion class detector 127. In this process, tap location information corresponding to the conversion mode selected by a user via the button 19 is supplied from the register 135 to the third tap selector 125, and the third tap selector 125 selects motion class taps based on the supplied tap location information.

The motion class detector 127 obtains class information MV indicating a motion class (a class indicating the degree of motion) by performing a calculation using pixel data given as the motion class tap data. The resultant class information MV is supplied to the class combiner 128.

Thus, via the process described above, the motion information Mv and the requantized code $Q_i$ are supplied to the class combiner 128. Based on the supplied motion information MV and requantized code $Q_i$, the class combiner 128 calculates equation (3) to determine the class code CL indicating a class for each pixel (of interest) in each pixel block of the output image signal Vout to be produced. The resultant class code CL is supplied as read address information to the coefficient memory 136 and the normalization factor memory 140.

In step S9, the coefficient memory 136 acquires address information by reading the class code CL supplied from the class combiner 128, and supplies coefficient data $W_i$ corresponding to the class code CL to the predictor 129.

In step S10, prediction associated with pixel values is performed, and the result is output. Thereafter, the process returns to step S5.

More specifically, in step S10, the first tap selector 123 selectively extracts data (pixel data) $x_i$ of prediction taps at locations in the vicinity of each pixel (pixel of interest) in each unit pixel block of the output image signal Vout to be produced from the input 525i image signal Vin, and the first tap selector 123 supplies the extracted data to the predictor 129. In this process, tap location information corresponding to the conversion mode selected by the user is supplied from the register 133 to the first tap selector 123, and the first tap selector 123 selects prediction taps based on the supplied tap location information.

Based on the prediction tap data xi supplied from the first tap selector 123 and the coefficient data $W_i$ read from the coefficient memory 136 and according to equation (4), the predictor 129 calculates pixel data $y_1$ to $y_p$ in each unit pixel block of the output image signal Vout to be produced. The calculated pixel data $y_1$ to $y_p$ in each unit pixel block of the output image signal Vout are sequentially supplied to the normalizer 130.

Based on the class code CL supplied as address information from the class combiner 128, the normalization factor memory 140 reads a normalization factor S corresponding to the coefficient data $W_i$ used in the calculation of the pixel data $y_1$ to $y_p$ output from the predictor 129 and supplies the read normalization factor S to the normalizer 130. The normalizer 130 normalizes the pixel data $y_1$ to $y_p$ supplied from the predictor 129 by dividing them by the normalization factor S. This normalization eliminates fluctuations in levels of the data $y_1$ to $y_p$ due to rounding errors of the coefficient data (for use in equation (4)) calculated according to generation equation (5).

As described above, the normalizer 130 normalizes the pixel data $y_i$ to $y_p$ of each unit pixel block and supplies the resultant data to the pose processor 131. From the normalized pixel data $y_1$ to $y_p$ of each unit pixel block sequentially output from the normalizer 130, the pose processor 131 generates the output image signal Vout in a format corresponding to specified one of the first to third conversion mode. More specifically, a 1080i signal is output when the first conversion mode is selected, while a XGA signal is output when the second conversion mode is selected. In the case in which the third selection mode is selected, a 525i signal is output.

As described above, using the coefficient seed data of each class loaded from the information memory bank 137, the spatial parameters ph a d pv generated by the horizontal/vertical phase information generator 141, the image quality parameters rh and rv generated by the image quality information generator 142, and the frame phase value t generated by the frame phase information generator 143, the coefficient generator 138 generates the coefficient data $W_i$ of the prediction equation corresponding to the spatial parameters ph a d pv generated by the horizontal/vertical phase information generator 141, the image quality parameters rh and rv generated by the image quality information generator 142, and the frame phase value t generated by the frame phase information generator 143, for each class, and the coefficient generator 138 stores the generated coefficient data $W_i$ in the coefficient memory 136. The coefficient data $W_i$ selected based on the class code CL are read from the coefficient memory 136 to the predictor 129. Using these coefficient data $W_i$, the predictor 129 calculates the pixel data $y_1$ to $y_p$ of each unit pixel block of the output image signal Vout. Thus, a great number of coefficient data used in conversion into various formats or image sizes such as a 1080i signal or a XGA signal can be generated from a small number of coefficient seed data stored in the memory. This makes unnecessary for the coefficient memory 136 to have a large storage capacity.

In a case in which it is determined in step S1 that the button 15 is pressed into the stop state (or an operation control button is pressed to change the playback speed, for example, to a slow playback speed), the process proceeds to step S11.

In step S11, the frame selector 122 detects frame positions of a start frame FS and an end frame FE of the image data stored in the image memory 121, based on the information indicating the positions of the control knobs 16a and 16b of the system controller 3.

In step S12, the frame phase information generator 143 calculates the frame phase value of a next frame to be generated, depending on the setting performed via the control knob 17 of the system controller 3.

The frame phase value is explained below. When the slow playback mode is selected by operating the control knob 17, if an image is played back at a slow speed by using only existing frames, each frame is displayed for a longer period than in the normal playback mode, and thus the movement of the image becomes awkward. To obtain smooth motion of the image in the slow playback mode, new frames are generated and inserted between existing frames.

Figure 5:
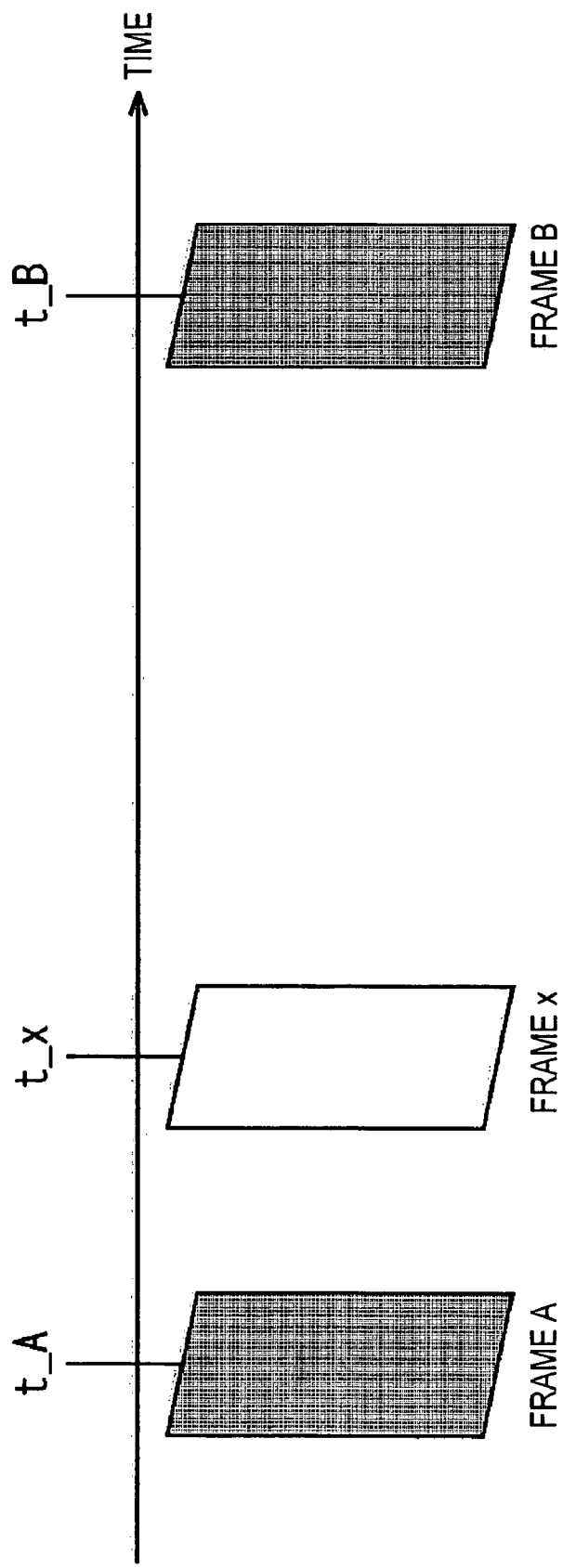
FIG. 5 is a diagram showing frame phase values.

When a new frame is generated, the frame position of the frame relative to an existing frame is specified by a frame phase value. More specifically, the frame phase value indicates the relative position of a frame to be produced with respect to an existing frame (stored in the image memory 121) located after or before the frame to be produced. For example, when a new frame x is generated between existing frames A and B stored in the image memory 121 as shown in FIG. 5, if times at which the frames A and B were taken are denoted by $t_A$ and $t_B$ and a time of the frame to be generated is denoted by $t_x$ ($t_A \leq t_x < t_B$), the frame phase value of the frame x is given by $(t_x-t_A)/(t_B-t_A)$.

For example, when the playback speed is set to be 0.5 times the normal playback speed via the control knob 17, smooth motion can be obtained at the specified slow playback speed if the number of frames is increased by a factor of 2 and the frames are played back at the same frame rate as in the normal playback mode. Thus, the frame phase information generator 143 sets the frame phase value relative to the existing frame to 0.5.

In step S13, parameters ph, pv, rh, rv, and t are generated in a similar manner to step S2 except that the value calculated in step S12 is used as the frame phase value t.

In step S14, it is determined whether a current frame is an end frame of the frames stored in the image memory 121. If it is determined that the current frame is not the end frame, the process proceeds to step S15.

In step S15, coefficient data is generated from coefficient seed data in a similar manner to step S4.

In step S16, the frame selector 122 stops receiving of the image signal from the buffer memory 113, and reads the image signal stored in the image memory 121. More specifically, the frame selector 122 sequentially reads the image signal starting from the start frame FS until the end frame FE is reached, according to the timing of image processing.

In step S17, the frame selector 122 determines whether processing is completed for all pixels of one frame. If it is determined that processing is completed for all pixels of one frame, the process returns to step S12. On the other hand, if it is determined in step S17 that processing is not completed for all pixels of one frame, the process proceeds to step S18.

Steps S18 to S20 are performed in a similar manner to steps S8 to 10, and thus a duplicated description thereof is not given herein.

In the case in which if it is determined in step S14 that the current frame is the end frame, the process proceeds to step S21. In step S21, the frame selector 122 determines whether the button 15 is released from the stop state. If no, the process returns to step S11. Thus, steps S12 to S20 are performed repeatedly, that is, the image signal stored in the image memory 121 of the period set by the control knobs 16a and 16b is repeatedly played back at the playback speed set by the control knob 17, until the button 15 is released from the stop state.

If it is determined in step S21 that the button 15 is repressed and the stop state is released, the processing flow returns to step S1 to again perform the process from step S1.

In the present embodiment, as described above, an image of a specified scene centered at a specified point is displayed smoothly with specified image quality at a specified playback speed.

Now, coefficient seed data is explained in further detail.

As described above, the coefficient seed data for each class is stored in the information memory bank 137. The coefficient seed data is acquired in advance by means of learning.

An example of a method of producing coefficient seed data is described below. Coefficient seed data $w_{100}$ to $w_{n10}$ used as coefficients in the generation equation (5) are generated as follows. Herein, $T_i$ (n=00 to 10) is defined by equation (7) shown below.

$$T00=1, T01=pv, T02=ph, T03=rv, T04=rh, T05=t,$$
$$T06=(pv)^2, T07=(ph)^2, T08=(rv)^2, T09=(rh)^2,$$
$$T10=(t)^2 \quad (7)$$

Rewriting equation (5) using equation (7) yields equation (8).

$$W_j = \sum_{i=00}^{10} W_{ji} T_i \quad (8)$$

Coefficients $w_{ji}$ in equation (8) are determined by means of learning. More specifically, values of the coefficients are determined from student image data and teacher image data such that the square error is minimized by means of least square method. If the number of learning data is denoted by m, the residual error of kth ($1 \leq k \leq m$) learning data is denoted y $e_k$, and the sum of square errors is denoted by E, then E is given by equation (9) using equations (4) and (5).

$$\begin{aligned} E &= \sum_{k=1}^{m} e k^2 \\ &= \sum_{k=1}^{m} [y_k - (W_1 x_{1k} + W_2 x_{2k} + \ldots + W_n x_{nk})]^2 \\ &= \sum_{k=1}^{m} \{y_k - [(T_0 w_{10} + T_1 w_{101} + \ldots + T_{10} w_{110}) x_{1k} + \ldots + \\ &\quad (T_0 w_{n00} + T_1 w_{n01} + \ldots + T_{10} w_{n10}) x_{nk}]\}^2 \\ &= \sum_{k=1}^{m} \{y_k - [(w_{i00} + w_{i01}(pv) + w_{i02}(ph) + w_{i03}(rv) + \\ &\quad w_{i04}(rh) + w_{i05}(t) + w_{i06}(pv)^2 + w_{i07}(ph)^2 + \\ &\quad w_{i08}(rv)^2 + w_{i09}(rh)^2 + w_{i10}(t)^2) x_{1k} + \ldots + \\ &\quad (w_{n00} + w_{n01}(pv) + w_{n02}(ph) + w_{n03}(rv) + \\ &\quad w_{n04}(rh) + w_{n05}(t) + w_{n06}(pv)^2 + w_{n07}(ph)^2 + w_{n08}(rv)^2 + \\ &\quad w_{n09}(rh)^2 + w_{n10}(t)^2) x_{nk}]\}^2 \end{aligned} \quad (9)$$

where $x_{ik}$ is kth pixel data at a location of an ith prediction tap of a student image, and $y_k$ is corresponding kth pixel data of a teacher image.

In the least square method, $w_{ji}$ are determined such that the partial differential of equation (9) with respect to $w_{ij}$ becomes 0. That is, $w_{ji}$ are determined by solving partial differential equation (10).

$$\frac{\partial E}{\partial w_{ij}} = \sum_{k=1}^{m} 2\left(\frac{\partial e_k}{\partial w_{ij}}\right) e_k = -\sum_{k=1}^{m} 2 T_j x_{ik} e_k = 0 \quad (10)$$

If $X_{ipjq}$ and $Y_{ip}$ are defined by equations (11) and (12), respectively, equation (10) can be rewritten as equation (13).

$$X_{ipjq} = \sum_{k=1}^{m} x_{ik} T_p x_{jk} T_q \qquad (11)$$

$$Y_{ip} = \sum_{k=1}^{m} x_{ik} T_p y_k \qquad (12)$$

$$\begin{pmatrix} X_{100100} & X_{100101} & X_{100102} & \cdots & X_{100110} & X_{100200} & \cdots & X_{100n10} \\ X_{101100} & X_{101101} & X_{101102} & \cdots & X_{101110} & X_{101200} & \cdots & X_{101n10} \\ X_{102010} & X_{102101} & X_{102102} & \cdots & X_{102110} & X_{102200} & \cdots & X_{102n10} \\ \vdots & \vdots & \vdots & \ddots & \vdots & \vdots & \ddots & \vdots \\ X_{110100} & X_{110101} & X_{110102} & \cdots & X_{100110} & X_{100200} & \cdots & X_{110n10} \\ X_{200100} & X_{200101} & X_{200102} & \cdots & X_{200110} & X_{200200} & \cdots & X_{200n10} \\ \vdots & \vdots & \vdots & \ddots & \vdots & \vdots & \ddots & \vdots \\ X_{n10100} & X_{n10101} & X_{n10102} & \cdots & X_{n10110} & X_{n10200} & \cdots & X_{n10n10} \end{pmatrix} \begin{pmatrix} w_{100} \\ w_{101} \\ w_{102} \\ \vdots \\ w_{110} \\ w_{200} \\ \vdots \\ w_{n10} \end{pmatrix} = \begin{pmatrix} Y_{100} \\ Y_{101} \\ Y_{102} \\ \vdots \\ Y_{110} \\ Y_{200} \\ \vdots \\ Y_{n10} \end{pmatrix} \qquad (13)$$

This equation is called a normal equation. The coefficient seed data can be obtained by solving the normal equation with respect to $w_{xy}$ using, for example, the sweeping-out method (Gauss-Jordan's elimination method).

Figure 6:
FIG. 6 is a diagram conceptually showing a method of generating coefficient seed data.

FIG. 6 shows the concepts of the method of generating the coefficient seed data. From a relationship between a high-speed high-definition (HD) image signal (1050i signal) used as a teacher signal and a SD signal (525i signal) used as a student signal, coefficient seed data $W_{ji}$ of a coefficient $W_j$ represented using parameters ph, pv, rh, rv, and t is determined.

In the present example, student images are set for six frames corresponding to frame phase values $t_1$ to $t_6$. When the high-speed HD image signal is prepared, it is taken, for example, at a frame rate 6 times higher than the normal frame rate (60 frames/sec).

Figure 7:
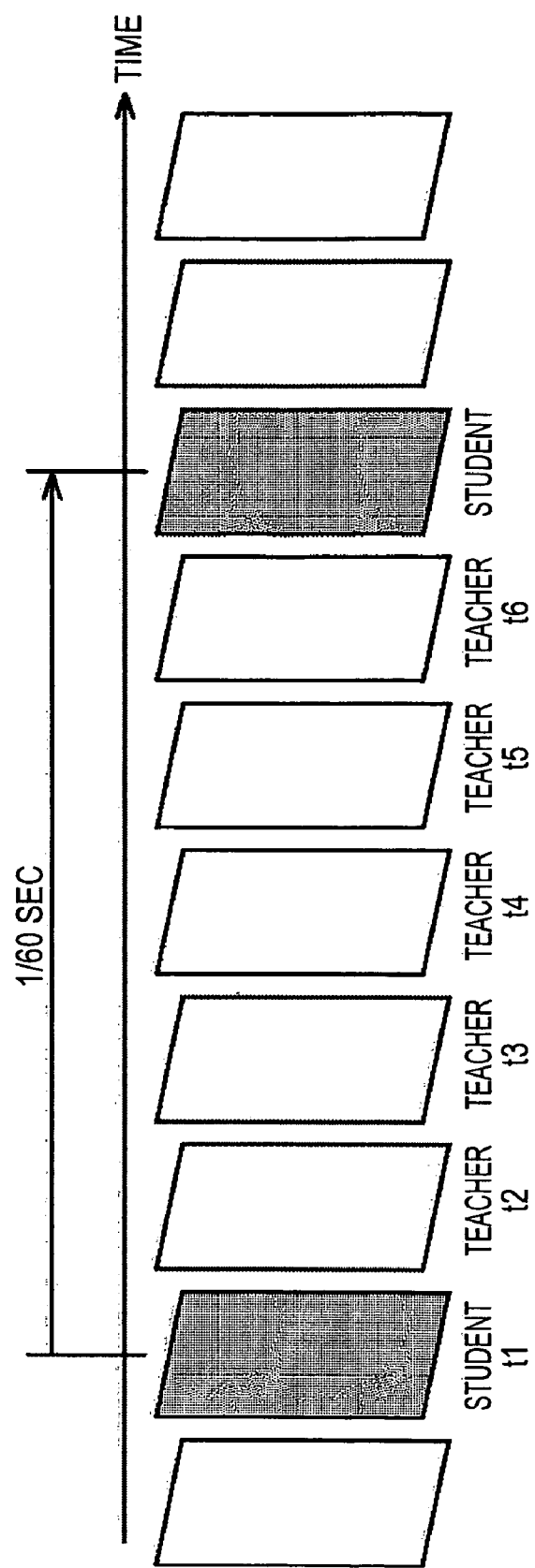
FIG. 7 is a diagram conceptually illustrating a method of generating coefficient seed data for each frame phase value.

One frame is extracted every six frames from the high-speed HD image and an image signal of each extracted frame is employed as a student signal, and signals of the other frames are used as teacher signals. In the example shown in FIG. 7, coefficient seed data is generated at intervals of 1/6 of frame phase value t by employing a teacher signal $t_2$ with a frame phase value t=1/6, a teacher signal $t_3$ with a frame phase value t=2/6, a teacher signal $t_4$ with a frame phase value t=3/6, a teacher signal $t_5$ with a frame phase value t=4/6, and a teacher signal $t_5$ with a frame phase value t=5/6. A student frame with a frame phase value t=0/6 (corresponding to a student frame t1 shown in FIG. 7) is one of existing frames, and learning is performed between the student signal and the teacher signal with the frame phase value t=0/6.

For each frame phase value t, one student signal is set for each of 8 values of the noise reduction parameter rh (rh1 to rh8) and 4 values of the sharpness parameter rv (rv1 to rv4), and thus a total of 32 student signals are set as shown in FIG. 6.

In FIG. 6, for each value of the image quality parameters rh and rv, 8 values of the horizontal spatial parameter ph and 4 values of the vertical spatial parameter pv are set, and thus a total of 32 DS signals are generated.

Figure 8:
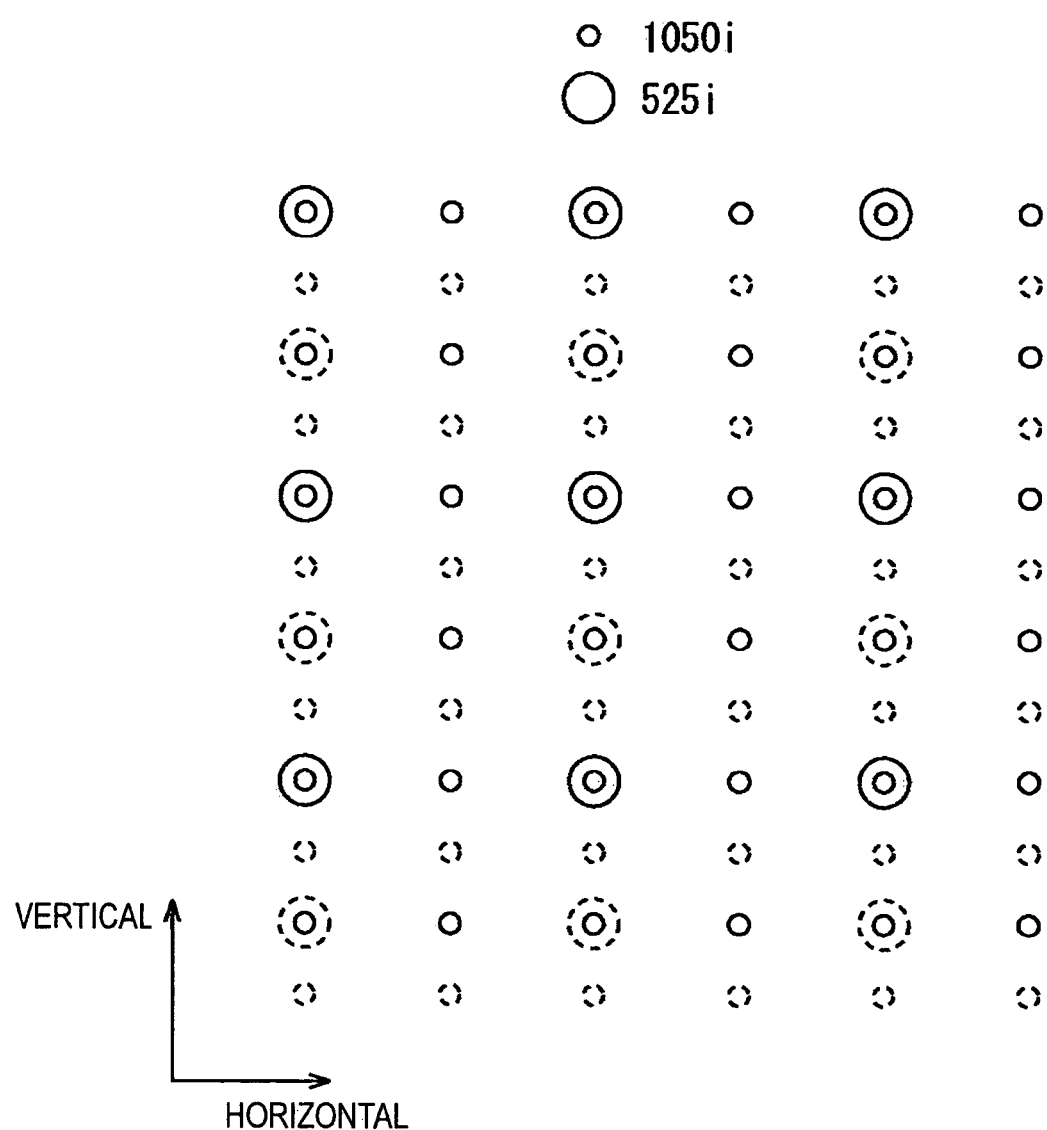
FIG. 8 is a diagram showing a relative pixel locations between a 525i signal (SD signal) and a 1080i signal (HD signal)

FIG. 8 shows locations of pixels of a 525i signal and those of a 1050i signal. Pixels of the 525i signal are indicated by greater dots, and pixel of the 1050i signal are indicated by smaller dots. In FIG. 8, solid lines represent pixel locations in an odd field, and dashed lines represent pixel locations in an even field.

Figure 9:
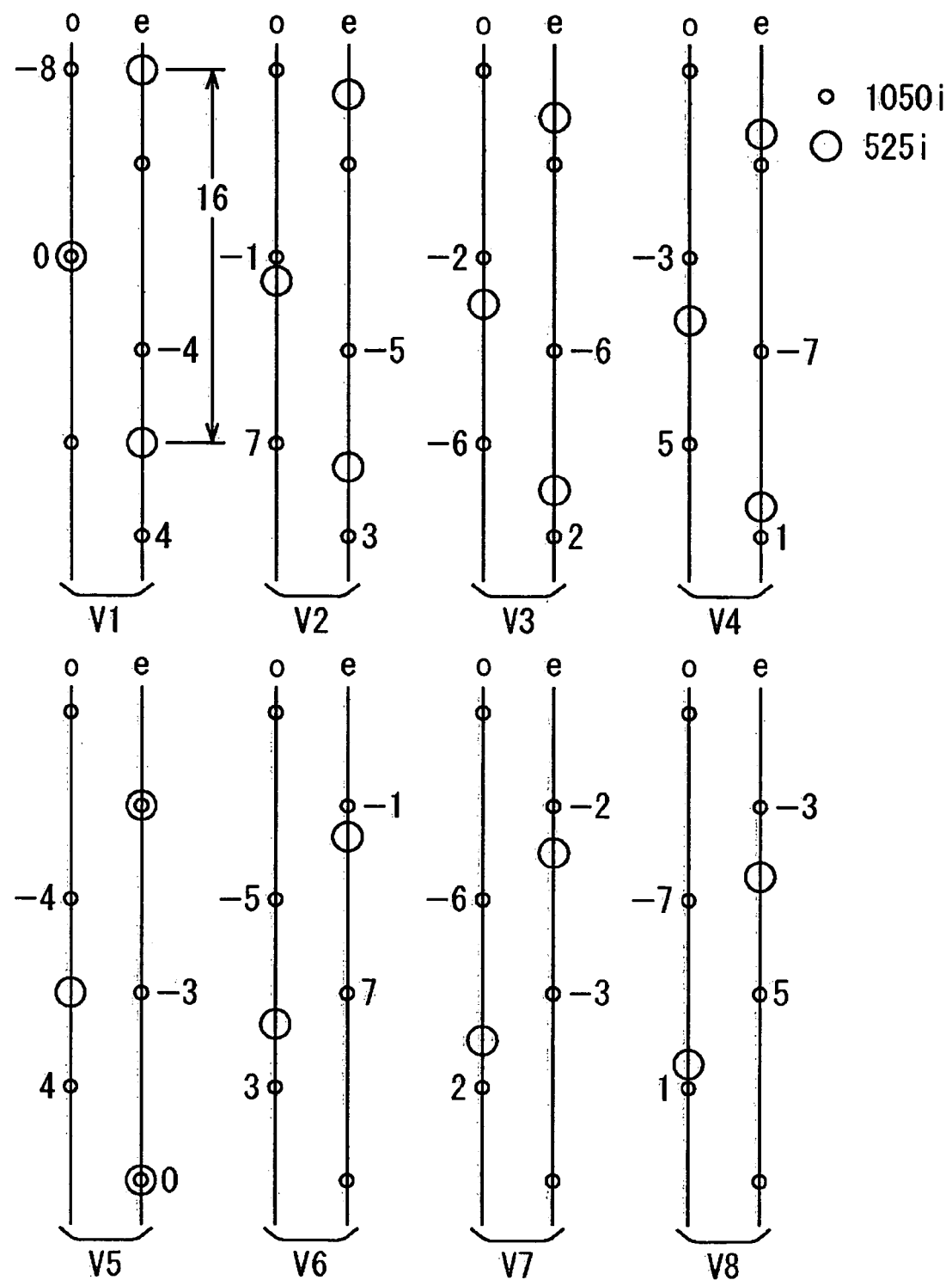
FIG. 9 is a diagram showing a manner in which a spatial phase is shifted to 8 different values in a vertical direction.

By shifting the phase of the SD signal to 8 levels in the vertical direction and to 4 levels in the horizontal direction, a total of 8×4=32 SD signals are generated. FIG. 9 shows a manner in which the phase of the SD signal is shifted by 8 values (into states V1 to V8) in the vertical direction. In FIG. 9, the pixel-to-pixel distance in the vertical direction of the SD signal is equal to 16, and the positive direction is taken in a downward direction in the figure. In FIG. 9, "o" denotes an odd field and "e" denotes an even field.

In the state V1, the phase shift of the SD signal is equal to 0. In this state, pixels of the HD signal have phases of 4, 0, −4, and −8 relative to pixels of the SD signal. In the state V2, the phase shift of the SD signal is equal to 1. In this state, pixels of the HD signal have phases of 7, 3, −1, and −5 relative to pixels of the SD signal. In the state V3, the phase shift of the SD signal is equal to 2. In this state, pixels of the HD signal have phases of 6, 2, −2, and −6 relative to pixels of the SD signal. In the state V4, the phase shift of the SD signal is equal to 3. In this state, pixels of the HD signal have phases of 5, 1, −3, and −7 relative to pixels of the SD signal.

In the state V5, the phase shift of the SD signal is equal to 4. In this state, pixels of the HD signal have phases of 4, 0, −4, and −8 relative to pixels of the SD signal. In the state V6, the phase shift of the SD signal is equal to 5. In this state, pixels of the HD signal have phases of 7, 3, −1, and −5 relative to pixels of the SD signal. In the state V7, the phase shift of the SD signal is equal to 6. In this state, pixels of the HD signal have phases of 6, 2, −2, and −6 relative to pixels of the SD signal. In the state V8, the phase shift of the SD signal is equal to 7. In this state, pixels of the HD signal have phases of 5, 1, −3, and −7 relative to pixels of the SD signal.

Figure 10:
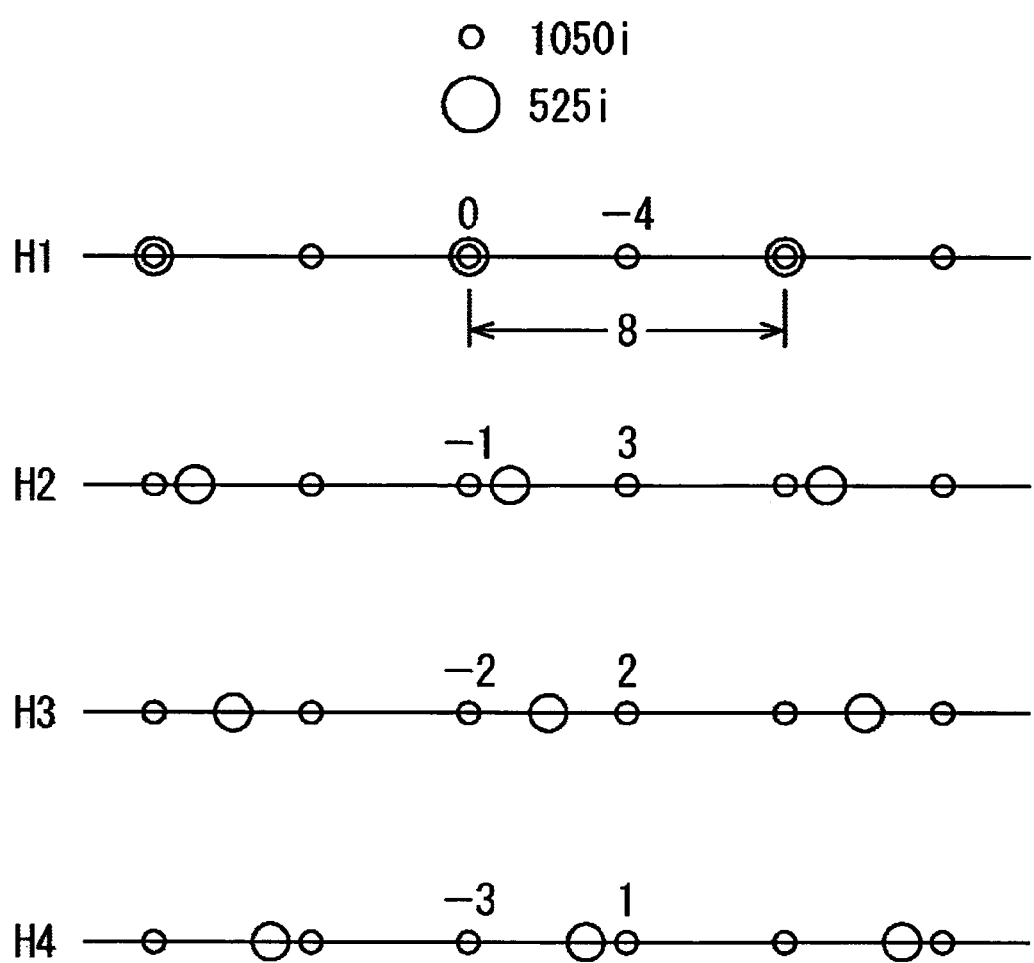
FIG. 10 is a diagram showing a manner in which a spatial phase is shifted in a horizontal direction by 4 different values.

FIG. 10 shows a manner in which the phase of the SD signal is shifted by 4 levels (into states H1 to H4) in the horizontal direction. In FIG. 10, the pixel-to-pixel distance in the horizontal direction of the SD signal is equal to 8, and the positive direction is taken in a rightward-direction in the figure.

In the state H1, the phase shift of the SD signal is equal to 0. In this state, pixels of the HD signal have phases of 0 and, −4 relative to pixels of the SD signal. In the state H2, the phase shift of the SD signal is equal to 1. In this state, pixels of the HD signal have phases of 3 and, −1 relative to pixels of the SD signal. In the state H3, the phase shift of the SD signal is equal to 2. In this state, pixels of the HD signal have phases of 2 and, −2 relative to pixels of the SD signal. In the state H4, the phase shift of the SD signal is equal to 3. In this state, pixels of the HD signal have phases of 1 and, −3 relative to, pixels of the SD signal.

Figure 11:
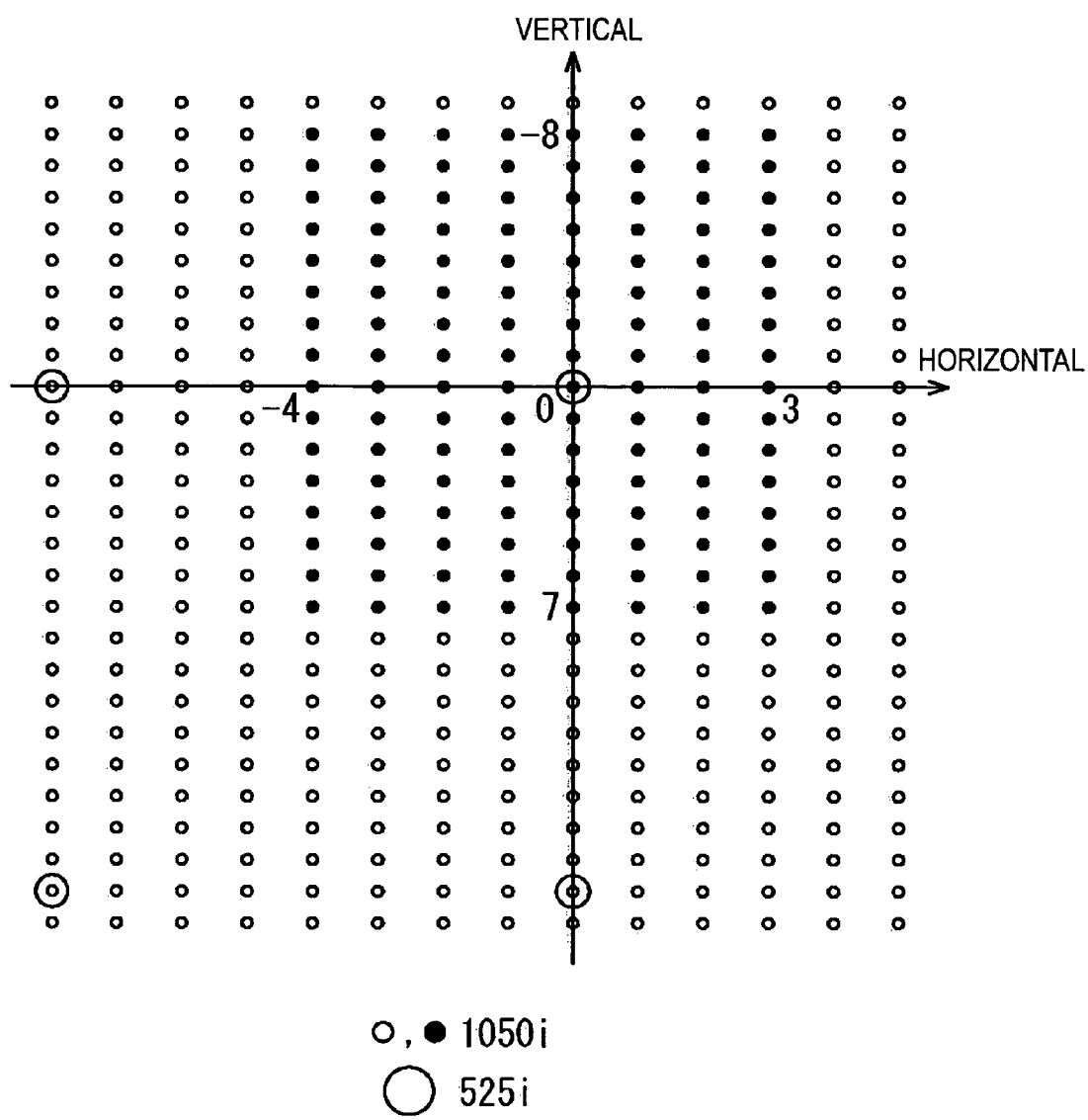
FIG. 11 is a diagram showing relative spatial phases of a SD signal (525i signal) and a HD signal (1050i signal)

FIG. 11 shows spatial phases of pixels of the HD signal relative to pixels of the SD signals, wherein 32 different SD signals are generated by shifting the vertical spatial phase by 8 values and the horizontal spatial phase by 4 values. In FIG. 11, the pixel phases of the HD signal relative to the pixels of the SD signal are indicated by solid circles.

Referring again to FIG. 6, coefficient seed data is generated by performing learning between the HD signals and a total of 6144 (=6×32×32) SD signals generated by shifting the frame phase by 6 values, the image quality parameter rv associated with the noise reduction by 8 values, the image quality parameter rh associated with the sharpness by 4 values, the vertical spatial phase parameter pv by 8 values, and the horizontal spatial phase parameter ph by 4 values.

Figure 12:
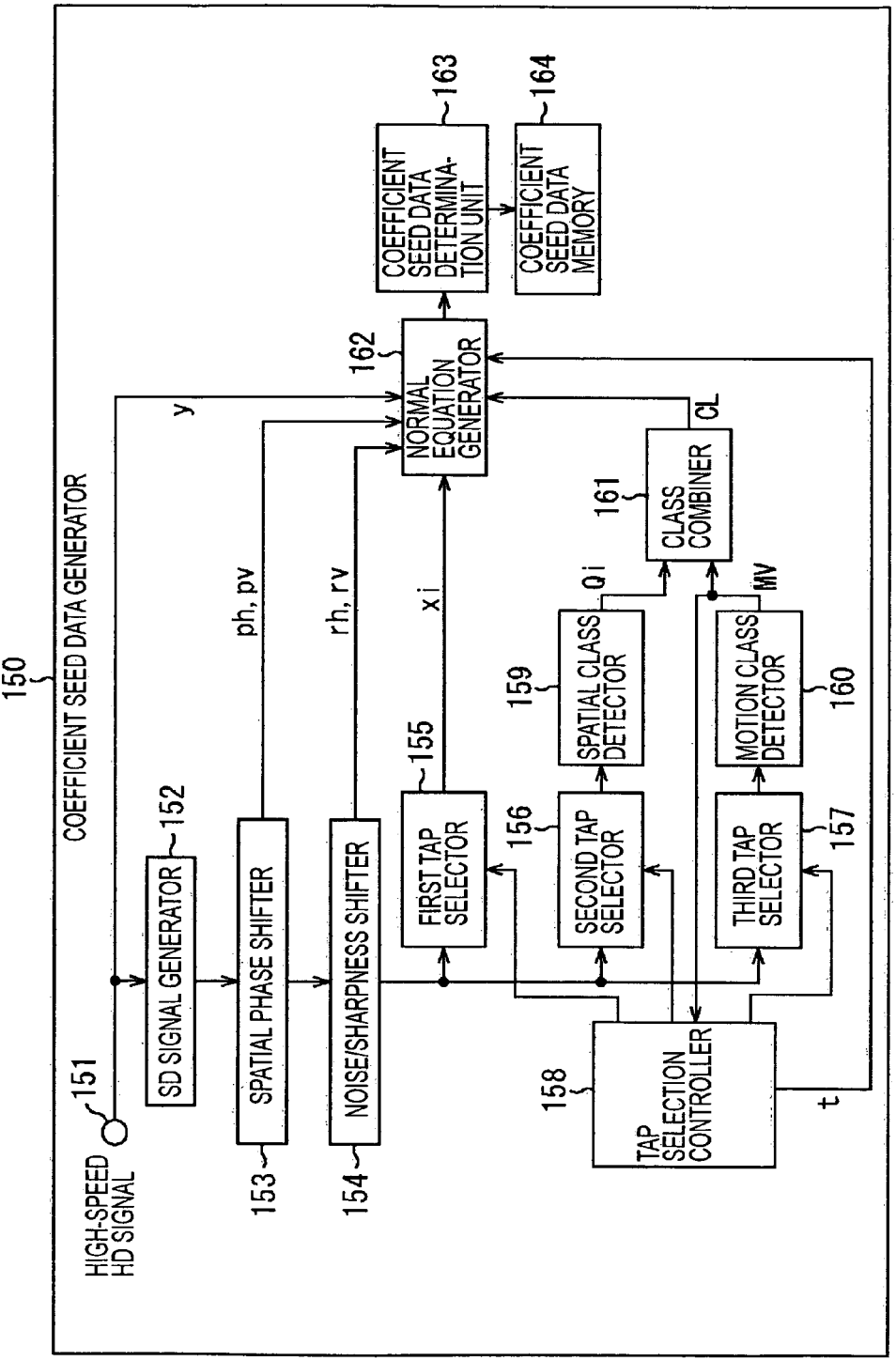
FIG. 12 is a block diagram showing an example of a configuration of a coefficient seed data generator.

FIG. 12 shows a coefficient seed data generator 150 for generating coefficient seed data in a manner described above with reference to FIG. 6. When a SD signal generator 152 of the coefficient seed data generator 150 receives via an input terminal 151 a high-speed HD signal (1050i signal) as a teacher signal, the SD signal generator 152 generates a SD signal as an input signal by partially discarding pixels of the high-speed HD signal in the horizontal and vertical directions (or by performing filtering). The generated SD signal is supplied to a spatial phase shifter 153.

The spatial phase shifter 153 generates a total of 32 different SD signals from the SD signal supplied from the SD signal generator 152 by varying the parameter ph indicating the spatial phase shift in horizontal direction by 8 values and the parameter pv indicating the spatial phase shift in the vertical direction by 4 values. The generated 32 SD signals are supplied to a noise/sharpness shifter 154, and the parameters ph and pv are supplied to a normal equation generator 162. The spatial phase shifter 153 may be formed using a sin x/x filter or other filters capable of shifting the phase. An over-sampling filter capable of extracting particular phases may also be used.

The noise/sharpness shifter 154 generates a total of 32 different SD signals from each SD signal supplied from the spatial phase shifter 153 by varying image quality parameters rh and rv, that is by varying the parameter rh indicating the degree of noise reduction by 4 values and the parameter rv indicating the sharpness by 8 values. The generated SD signals are supplied to the first to third tap selectors 155 to 157, and the parameters rh and rv are supplied to a normal equation generator 162. More specifically, the noise/sharpness shifter 154 add four levels of noise corresponding to the values of noise parameter rh to the SD signal supplied from the spatial phase shifter 153, and the noise/sharpness shifter 154 changes the sharpness of each resultant SD signal by 8 levels corresponding to the values of sharpness parameter rv by passing the SD signal through a low pass filter (LPF).

The first to third tap selectors 155 to 157 selectively extract SD pixel data of a plurality of pixels in the vicinity of a pixel of interest in the HD signal (1050i signal) from the SD signal (525i signal) output from the spatial phase shifter 153, and the first to third tap selectors 155 to 157 supply the extracted SD pixel data to the normal equation generator 162, the spatial class detector 159, and motion class detector 160, respectively.

The first to third tap selectors 155 to 157 are similar to the first to third tap selectors 123 to 125 described above of the signal processing unit 120. In the above process, the first to third tap selectors 155 to 157 select taps in accordance with tap location information supplied from a tap selection controller 158.

The tap selection controller 158 controls the first to third tap selectors 155 to 157 to extract taps from a frame corresponding to a varying frame phase value t. Furthermore, based on the motion class information MV supplied from a motion class detector 160 described later, the tap selection controller 158 determines whether tap location information selected by the third tap selector 157 has large motion, and controls the second tap selector 156 to select different taps depending on whether the tap location information selected by the third tap selector 157 has large motion.

A spatial class detector 159 detects a level distribution pattern of the spatial class tap data (SD pixel data) selectively extracted by the second tap selector 156, determines a spatial class based on the detected level distribution pattern. The class information indicating the determined spatial class is supplied to the class combiner 161. The spatial class detector 159 is similar to the spatial class detector 126 of the signal processing unit 120 described above. The spatial class detector 159 outputs, as class information indicating a spatial class, a requantized code $Q_i$ of each SD pixel data employed as spatial class tap data.

The motion class detector 160 detects a motion class, chiefly indicating the degree of motion, from the data (SD pixel data) of motion class taps selectively extracted by the third tap selector 157, and the motion class detector 160 outputs the resultant class information MV. The motion class detector 160 is similar in structure to the motion class detector 127 of the signal processing unit 120 described above. The motion class detector 160 calculates interframe differences from the motion class tap data (SD pixel data) selectively extracted by the third tap selector 157. The motion class detector 160 further determines the motion class, which is a measure of motion, by thresholding the mean value of absolute values of differences.

On the basis of the requantized code $Q_i$ output from the spatial class detector 159 as the class information indicating the spatial class and class information MV indicating the motion class output from the motion class detector 160, the class combiner 161 generates a class code CL indicating a class of the pixel of interest of the HD signal (1050i signal) and outputs the class code CL to the normal equation generator 162. The class combiner 161 is similar to the class combiner 128 described earlier of the signal processing unit 120.

The normal equation generator 162 generates the normal equation (equation (13)) used to obtain coefficient seed data $w_{100}$ to $w_{n10}$ for each class from each HD pixel data y at a location of interest in the HD signal supplied via the input terminal 151, the prediction tap data (SD pixel data) $x_i$ corresponding to the HD pixel data y and selectively extracted by the first tap selector 155, the class code CL corresponding to the HD pixel data y and output from the class combiner 161, the frame phase value t, the image quality parameters indicating the noise reduction level rv and the sharpness level rh, and the vertical and horizontal spatial parameters pv and ph.

In the above process, after learning data including a combination of one HD pixel data y and corresponding n prediction tap data is produced, 32 different SD signals are sequentially generated by stepwise changing horizontal and vertical phase parameters ph and pv supplied to the spatial phase shifter 153, and, for each of these SD signals, 32 SD different signals are sequentially generated by stepwise changing the noise reduction parameter rh and the sharpness parameter rv supplied to the noise/sharpness shifter 154. Furthermore, the frame phase value t supplied as a parameter to the tap selection controller 158 is sequentially varied to six levels, and the tap selection controller 158 controls the first to third tap selectors 155 to 157 to extracted taps corresponding to each of the frame phase values.

Thus, the normal equation generator 162 generates a large number of normal equations associated with learning data, and SD signals are sequentially generated and learning data are registered thereby making it possible to determine coefficient seed data used to obtain pixel data corresponding to arbitrary values of the spatial phase, the noise level, the sharpness, and frame phase.

Although not shown in the figure, a delay circuit for making timing adjustment may be disposed before the first tap selector 155 thereby adjusting the timing of supplying the SD pixel data $x_i$ from the first tap selector 155 to the normal equation generator 162.

The coefficient seed data determination unit 163 determines the coefficient seed data $w_{100}$ to $w_{n10}$ for each class by solving the each normal equation supplied from the normal equation generator 162. The generated coefficient seed data $w_{100}$ to $w_{n10}$ are stored in a coefficient seed memory 164. In the above process to determine the coefficient seed data $w_{100}$ to $w_{n10}$, the coefficient seed data determination unit 163 may solve the normal equation using, for example, the sweeping-out method.

Figure 13:
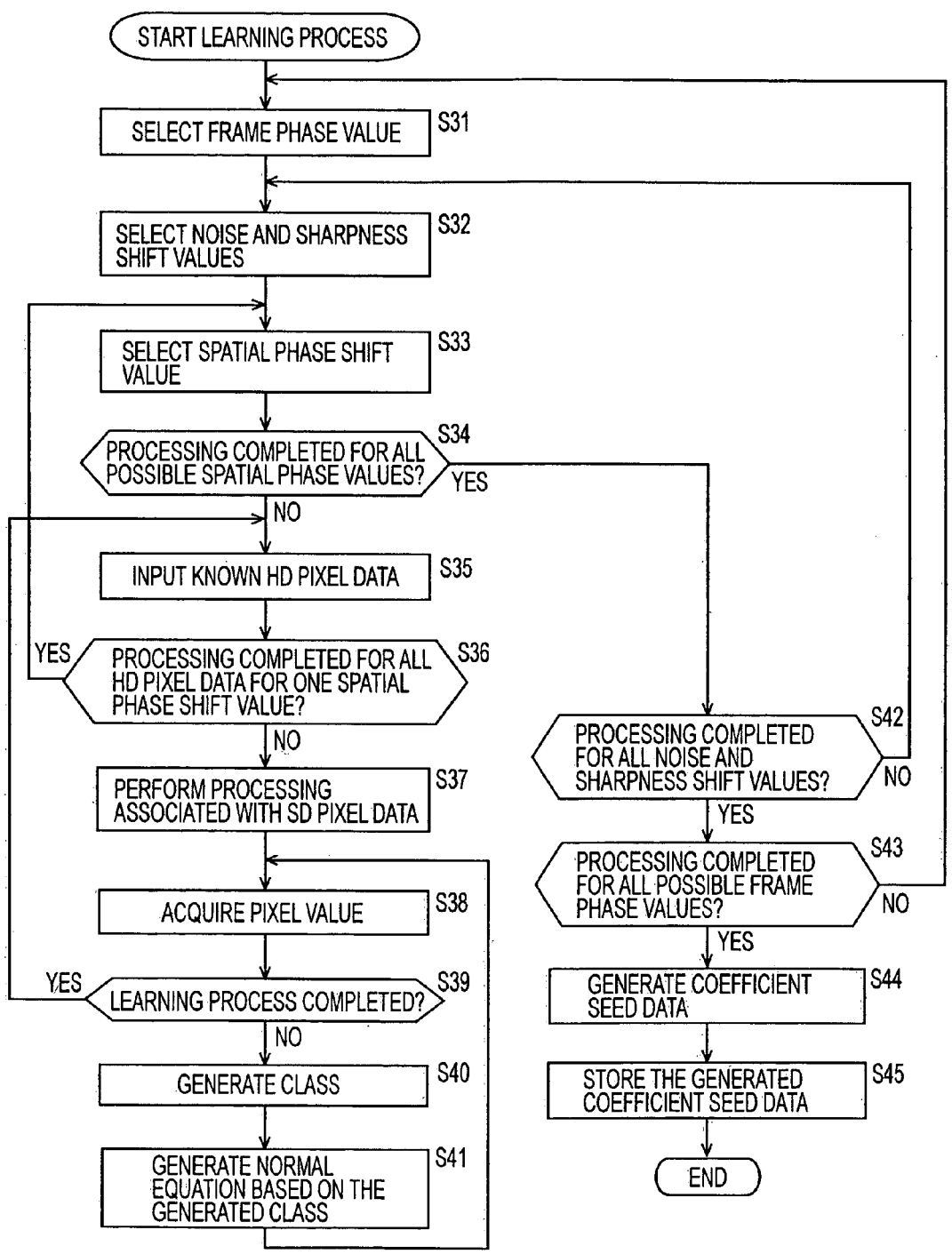
FIG. 13 is a flow chart showing a learning process performed by the coefficient seed data generator shown in FIG. 12.

The operation of the coefficient seed data generator 150 shown in FIG. 12 is described below with reference to a flow chart shown in FIG. 13.

In step S31, the tap selection controller 158 selects a frame phase value t. In the specific example shown in FIG. 6, the frame phase is sequentially varied to 6 values, and, in this step S31, the frame phase value is sequentially selected from the six values.

In step S32, the noise/sharpness shifter 154 selects unselected one of 32 combinations of a noise reduction parameter rh and a sharpness parameter rv respectively indicating noise and sharpness shift values.

In step S33, the spatial phase shifter 153 selects unselected one of 32 combinations of a horizontal spatial phase parameter ph and a vertical spatial phase parameter pv.

In step S34, the spatial phase shifter 153 determines whether the process is completed for all combinations of spatial phase parameters ph and pv. If it is determined that the process is not completed for all combinations, the process proceeds to step S35.

In step S35, known HD pixel data is input to the SD signal generator 152 and the normal equation generator 162.

In step S36, the SD signal generator 152 determines whether the process is completed for all HD pixel data for a current combination of spatial phase parameters. If it is determined that the process is not completed for all HD pixel data for the current combination of spatial phase parameters, the process proceeds to step S37. On the other hand, if it is determined that the process is completed for all HD pixel data for the current combination of spatial phase parameters, the process returns to step S33.

In step S37, a SD signal is generated from the HD signal, and the SD signal is processed based on the spatial parameters and image quality parameters.

More specifically, the SD signal generator 152 generates a SD signal (525i signal) used as a student signal by partially discarding, in the horizontal and vertical directions, pixels of the high-speed HD signal (1050i signal) supplied as a teacher signal via the input terminal 151. The generated SD signal is supplied to the spatial phase shifter 153.

Based on the spatial parameters ph and pv selected in step S33, the spatial phase shifter 153 generates a SD signal by shifting the vertical phase of the SD signal to one of 8 levels specified by the parameter pv and shifting the horizontal phase to one of 4 levels specified by the parameter ph. Thus, one of 32 SD signals different in spatial phase is obtained.

Based on the image quality parameters rh and rv selected in step S32, the noise/sharpness shifter 154 generates a SD signal by shifting the noise reduction level to one of 8 levels specified by the parameter rh and shifting the sharpness level one of 4 levels specified by the parameter rv. Thus, one of 32 SD signals different in noise and sharpness levels is obtained.

Thus, a total of 1024 different SD signals are eventually generated by the spatial phase shifter 153 and the noise/sharpness shifter 154.

In step S38, pixel values of pixels necessary for determination of the spatial class and pixel values of pixels necessary for determination of the motion class are acquired. That is, pixel values of pixels selected as spatial class taps and pixel values of pixels selected as motion class taps are acquired.

More specifically, the second tap selector 156 selectively extracts spatial class tap data (SD pixel data) at locations in the vicinity of a pixel of interest of the HD signal from one of 1024 different SD signals supplied from the noise/sharpness shifter 154. More specifically, when tap location information corresponding to the motion class detected by the motion class detector 160 is supplied from the tap selection controller 158 to the second tap selector 156, the second tap selector 156 selects tap bases on the supplied tap location information and supplies pixel values of pixels corresponding to the selected taps to the spatial class detector 159.

In step S39, the coefficient seed data determination unit 163 determines whether learning is completed for one frame. If it is determined that learning is not yet completed for one frame, the process proceeds to step S40.

In step S40, a class code CL is generated.

More specifically, the spatial class detector 159 performs the ADRC processing on the SD pixel data of the spatial class taps thereby obtaining a requantized code $Q_i$ serving as class information indicating a spatial class (indicating a spatial waveform) in accordance with equation (1).

Based on the tap location information supplied from the tap selection controller 158, the third tap selector 157 selectively extracts data (SD pixel data) of motion class taps in the vicinity of a pixel of interest of the HD signal from the 1024 different SD signals supplied from the noise/sharpness shifter 154. The extracted data is supplied to the motion class detector 160.

The motion class detector 160 calculates the class information MV indicating a motion class (indicating the degree of motion) from the respective SD pixel data given as the motion class tap data.

The class combiner 161 calculates equation (3) to determine the class code CL indicating a class for a pixel of interest of the HD signal, based on the motion information MV and the requantized code $Q_i$.

In step S41, a normal equation is generated based on the class code CL indicating the class. After step S41, the process returns to step S38.

More specifically, based on the tap location information supplied from the tap selection controller 158, the first tap selector 155 selectively extracts data (SD pixel data) of prediction taps in the vicinity of a pixel of interest in the HD signal from the SD signal supplied from the noise/sharpness shifter 154. The extracted data is supplied to the normal equation generator 162.

The normal equation generator 162 generates the normal equation (equation (13)) used to obtain coefficient seed data $w_{100}$ to $w_{n10}$ for each class from the HD pixel data y of each pixel of interest of the high-speed HD signal supplied via the input terminal 151, the prediction tap data (SD pixel data) $x_i$ corresponding to the HD pixel data y and selectively extracted by the first tap selector 155, the class code CL corresponding to the HD pixel data y and output from the class combiner 161, the frame phase value t, the noise reduction level rv, the sharpness level rh, and the vertical and horizontal spatial parameters pv and ph.

Steps S38 to S41 are performed repeatedly until it is determined in step S39 that learning is completed for one frame. If it is determined in step S39 that learning is completed for given one frame, the process returns to step S35. In step S35, known HD pixel data of a next frame is input.

If the spatial phase shifter 153 determines in step S34 that the process is completed for all combinations of spatial phase parameters ph and pv, the process proceeds to step S42.

In step S42, the noise/sharpness shifter 154 determines whether the process is completed for all combinations of parameters rh and rv associated with the noise reduction and sharpness levels. If it is determined that the process is not completed for all combinations, the process returns to step S32 to repeat the process for a new values of the parameters rh and rv associated with the noise reduction and sharpness levels. If it is determined in step S42 that the process is completed for all combinations of parameters rh and rv, the process proceeds to step S43.

In step S43, the tap selection controller 158 selects determines whether the process is completed for all values of the frame phase t. If it is determined that the process is not completed for all values of the frame phase, the process returns to step S31 to repeat the process for a new value of the frame phase t. If it is determined in step S43 that the process is completed for all values of the frame phase, the process proceeds to step S44.

Thus, the normal equation is generated for each of all possible values of the frame phase t, the noise reduction level rv, the sharpness level rh, the vertical spatial phase rh, and the horizontal spatial phase ph.

In step S44, the coefficient seed data determination unit 163 determines the coefficient seed data. In step S45, the generated coefficient seed data is stored in the coefficient seed data memory 164.

More specifically, the coefficient seed data determination unit 163 determines the coefficient seed data $w_{100}$ to $w_{n10}$ for each class by solving the each normal equation generated via the above-described process, and the generated coefficient seed data $w_{100}$ to $w_{n10}$ are stored in the coefficient seed memory 164 at an address specified for the corresponding class.

Via the process described above, the coefficient seed data generator 150 shown in FIG. 12 generates coefficient seed data $w_{100}$ to $w_{n10}$ to be stored in the information memory bank 137 of the signal processing unit 120 shown in FIG. 2.

Now, another example of a method of generating coefficient seed data is described below. Also in this method described below, by way of example, coefficient seed data $w_{100}$ to $w_{n10}$ used as coefficient data in the generation equation (5) are generated.

Figure 14:
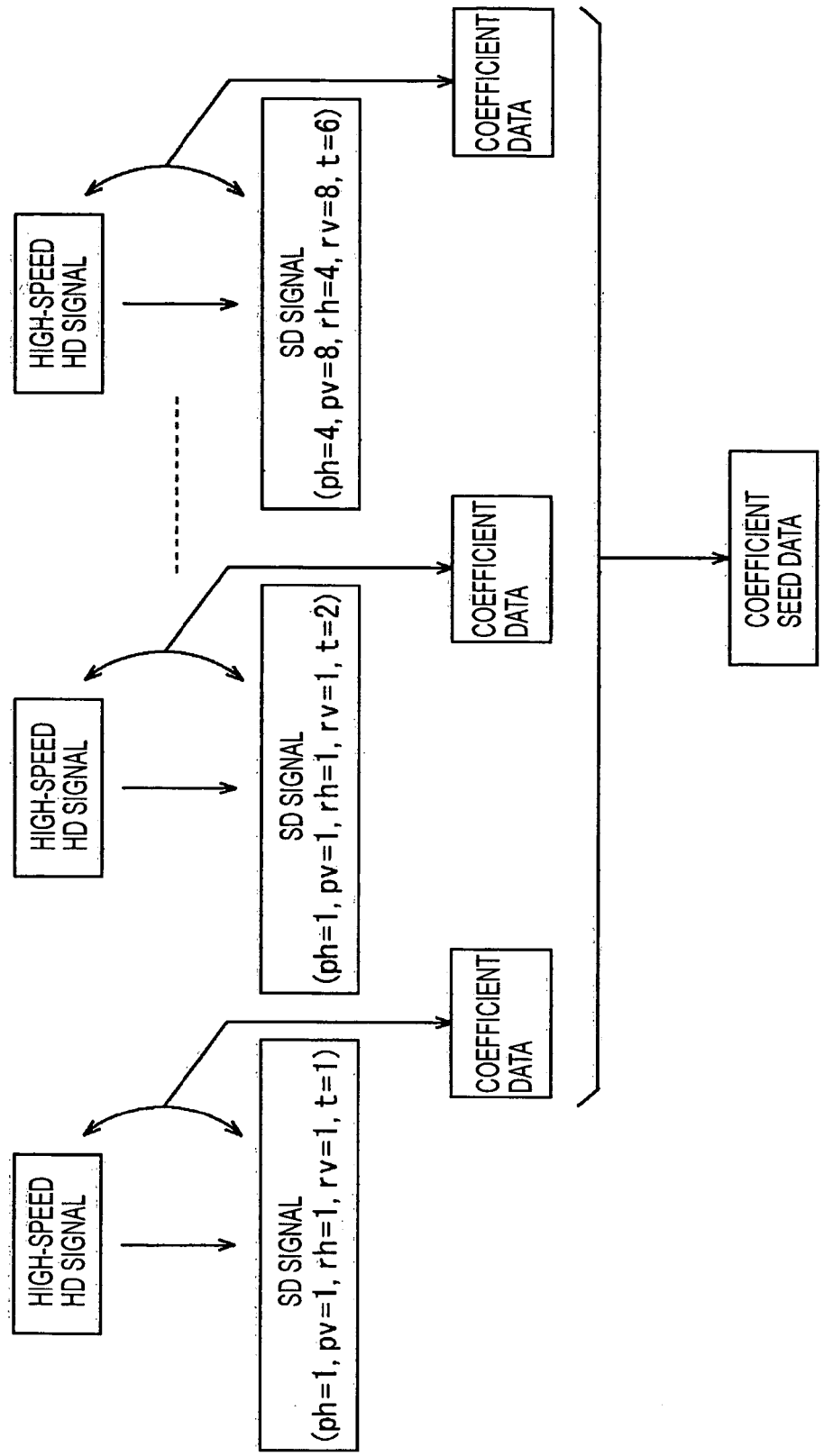
FIG. 14 is a diagram conceptually showing another method of generating coefficient seed data.

FIG. 14 shows the concepts of the method of generating the coefficient seed data. As in the previous method of generating the coefficient seed data, a total of 6144 (=6×32×32) SD signals are generated by shifting the frame phase to 6 values, the image quality parameter rv associated with the noise reduction to 8 values, the image quality parameter rh associated with the sharpness to 4 values, the vertical spatial phase parameter pv to 8 values, and the horizontal spatial phase parameter ph to 4 values. Learning then is performed between each SD signal and the HD signal to generate coefficient data $W_i$ of the prediction equation (4). Furthermore, coefficient seed data is generated using the coefficient data $W_i$ generated for each SD signal.

First, a method of determining the coefficient data of the prediction equation is described. In this method, the coefficients $W_i$ of the prediction equation (4) are determined by means of the least square method. By way of generalization, let us assume that an observation equation shown below in (14) associated with input data X, coefficient data W, and a predicted value Y is given.

$$XW = Y \quad (14)$$

$$X = \begin{pmatrix} x_{11} & x_{12} & \cdots & x_{1n} \\ x_{21} & x_{22} & \cdots & x_{2n} \\ \cdots & \cdots & \cdots & \cdots \\ x_{m1} & x_{m2} & \cdots & x_{mn} \end{pmatrix}, W = \begin{pmatrix} w_1 \\ w_2 \\ \cdots \\ w_3 \end{pmatrix}, Y = \begin{pmatrix} y_1 \\ y_2 \\ \cdots \\ y_m \end{pmatrix}$$

where m is the number of learning data and n is the number of prediction taps.

The least square method is applied to the data collected using the observation equation (14). For the observation equation (14), a residual equation is introduced as shown in equation (15).

$$XW = Y + E, \quad E = \begin{bmatrix} e_1 \\ e_2 \\ \cdots \\ e_m \end{bmatrix} \quad (15)$$

From the residual equation (15), the most likelihood values of $W_i$ are those that minimize $e^2$ in equation (16), and such values of $W_i$ can be obtained by solving equation (17).

$$e^2 = \sum_{i=1}^{m} e_i^2 \quad (16)$$

$$e_1 \frac{\partial e_1}{\partial W_i} + e_2 \frac{\partial e_2}{\partial W_i} + \cdots + e_m \frac{\partial e_m}{\partial W_i} = 0 \quad (i=1, 2, \cdots, n) \quad (17)$$

More specifically, the most likelihood values of $W_1$, $W_2, \ldots, W_n$ are obtained by solving n equations in (17). From equation (17), equation (18) is obtained. Furthermore, from this equation (18) and equation (14), equation (19) is obtained.

$$\frac{\partial e_i}{\partial W_1} = x_{i1}, \frac{\partial e_i}{\partial W_2} = x_{i2}, \cdots, \frac{\partial e_i}{\partial W_n} = x_{in} \quad (i=1, 2, \cdots, m) \quad (18)$$

$$\sum_{i=1}^{m} e_i x_{i1} = 0, \sum_{i=1}^{m} e_i x_{i2} = 0, \cdots, \sum_{i=1}^{m} e_i x_{i1} = 0 \quad (19)$$

From equations (15) and (19), equation (20) is obtained.

$$\begin{cases} \left(\sum_{j=1}^{m} x_{j1}x_{j1}\right)W_1 + \left(\sum_{j=1}^{m} x_{j1}x_{j2}\right)W_2 + \cdots + \left(\sum_{j=1}^{m} x_{j1}x_{jn}\right)W_n = \left(\sum_{j=1}^{m} x_{j1}y_j\right) \\ \left(\sum_{j=1}^{m} x_{j2}x_{j1}\right)W_1 + \left(\sum_{j=1}^{m} x_{j2}x_{j2}\right)W_2 + \cdots + \left(\sum_{j=1}^{m} x_{j2}x_{jn}\right)W_n = \left(\sum_{j=1}^{m} x_{j2}y_j\right) \\ \cdots \\ \left(\sum_{j=1}^{m} x_{jn}x_{j1}\right)W_1 + \left(\sum_{j=1}^{m} x_{jn}x_{j2}\right)W_2 + \cdots + \left(\sum_{j=1}^{m} x_{jn}x_{jn}\right)W_n = \left(\sum_{j=1}^{m} x_{jn}y_j\right) \end{cases} \quad (20)$$

A set of simultaneous normal equations (20) includes as many equations as the number n of unknown variables, and thus the set of simultaneous normal equations (20) can be solved. Thus, the most likelihood values of $W_i$ are obtained by solving the simultaneous normal equations (20) by means of, for example, the sweeping-out method.

A method of determining the coefficient seed data using coefficient data generated for each SD signal is explained below. Herein, let us assume that coefficient data for a class is obtained as $k_{(ph)(pv)(rh)(rv)(t)i}$ as a result of learning using a SD signal corresponding to particular values of parameters ph, pv, rh, rv, and t, where i denotes a prediction tap number. The coefficient seed data for this class is obtained from, $k_{(ph)(pv)(rh)(rv)(t)i}$ as described below.

Each coefficient data $W_i$ (i=1 to n) can be expressed by equation (5) using coefficient seed data $w_{i00}$ to $w_{n10}$. To determine the coefficient data $W_i$ using the least square method, the residual error is calculated according to equation (21).

$$\begin{aligned} e_{vhi} = & k_{(pv)(ph)(rv)(rh)(t)i} - \\ & (w_{i00} + w_{i01}(pv) + w_{i02}(ph) + w_{i03}(rv) + \\ & w_{i04}(rh) + w_{i05}(t) + w_{i06}(pv)^2 + \\ & w_{i07}(ph)^2 + w_{i08}(rv)^2 + w_{i09}(rh)^2 + \\ & w_{i10}(t)^2) \\ = & k_{(pv)(ph)(rv)(rh)(t)i} - \sum_{j=0}^{10} w_{ij}T_j \end{aligned} \quad (21)$$

where $T_j$ is given by equation (7). By applying the least square method to equation (21), equation (22) is obtained.

$$\begin{aligned} \frac{\partial}{\partial w_{i,j}} &= \sum_v \sum_h (e_{(pv)(ph)(rv)(rh)(t)i})^2 \\ &= \sum_v \sum_h 2\left(\frac{\partial e_{(pv)(ph)(rv)(rh)(t)i}}{\partial w_{i,j}}\right) e_{(pv)(ph)(rv)(rh)(t)i} \\ &= -\sum_v \sum_h 2T_j e_{(pv)(ph)(rv)(rh)(t)i} \\ &= 0 \end{aligned} \quad (22)$$

Herein, if $X_{jk}$ and $Y_j$ are defined by equations (23) and (24), respectively, equation (22) can be rewritten as equation (25) in the form of a normal equation.

$$X_{jk} = \sum_{pv} \sum_{ph} \sum_{rv} \sum_{rh} T_j T_k \quad (23)$$

$$Y_j = \sum_{pv} \sum_{ph} \sum_{rv} \sum_{rh} T_j k_{(pv)(ph)(rv)(rh)(t)i} \quad (24)$$

$$\begin{bmatrix} x_{0000} & x_{0001} & \cdots & x_{0010} \\ x_{0110} & x_{0111} & \cdots & x_{0110} \\ \vdots & \vdots & \ddots & \vdots \\ x_{1090} & x_{1091} & \cdots & x_{1010} \end{bmatrix} \begin{bmatrix} w_{i0} \\ w_{i1} \\ \vdots \\ w_{i10} \end{bmatrix} = \begin{bmatrix} Y_0 \\ Y_1 \\ \vdots \\ Y_{10} \end{bmatrix} \quad (25)$$

The coefficient seed data $w_{100}$ to $w_{n10}$ can be determined by solving the normal equation (25) by means of, for example, the sweeping-out method.

Figure 15:
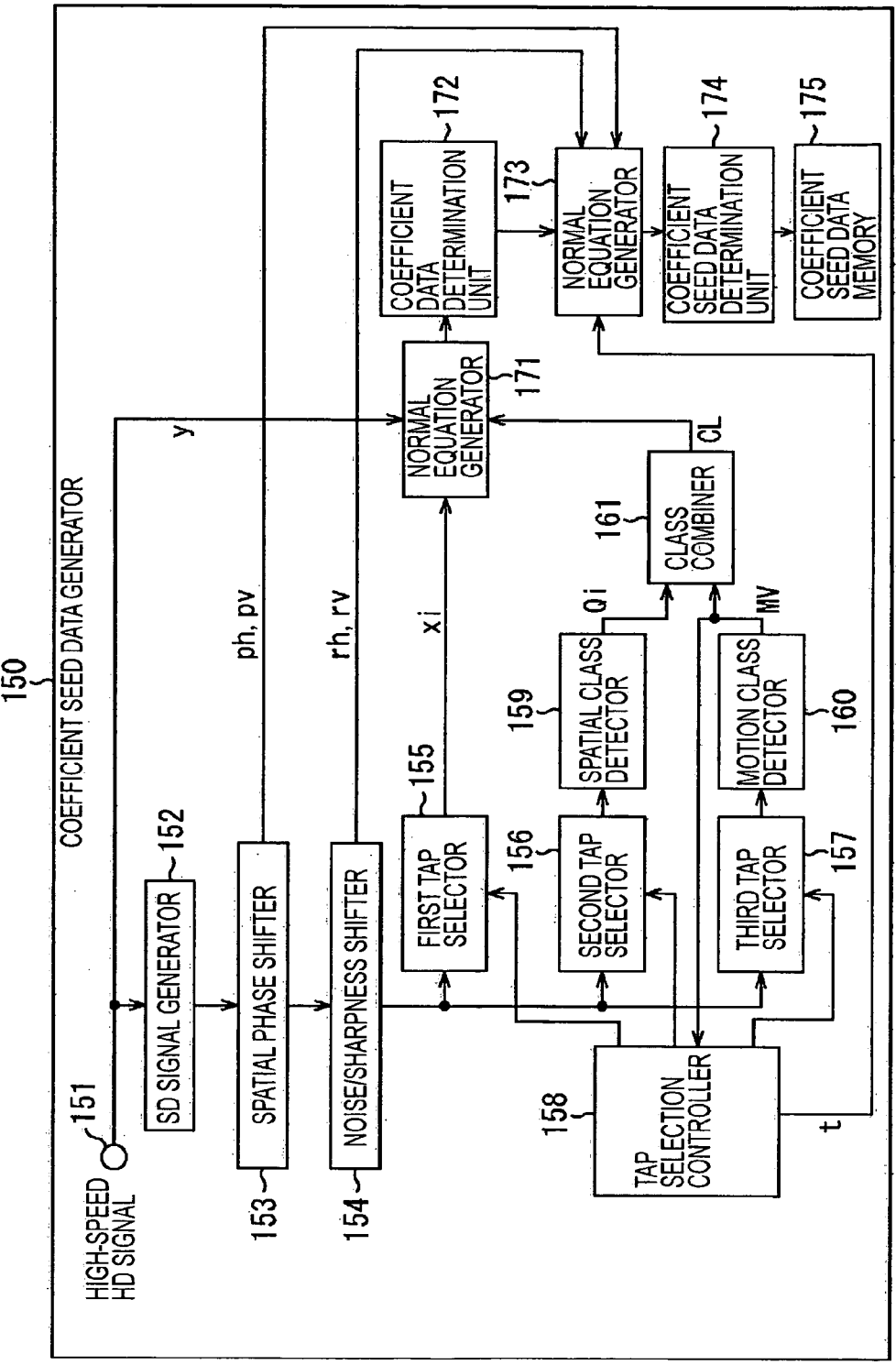
FIG. 15 is a block diagram showing another example of a configuration of the coefficient seed data generator.

FIG. 15 shows a coefficient seed data generator 150 for generating coefficient seed data in a manner described above with reference to FIG. 14. In FIG. 15, similar parts to those in FIG. 12 are denoted by similar reference numerals and they are not described herein unless a further description is needed.

The normal equation generator 171 generates the normal equation (equation (20)) used to obtain coefficient data $W_i$ (i=1 to n) for each class from each HD pixel data y at a location of interest in the HD signal supplied via the input terminal 151, the prediction tap data (SD pixel data) xi corresponding to the HD pixel data y and selectively extracted by the first tap selector 155, and the class code CL generated by the class combiner 161 for each HD pixel data y.

In the above process, after learning data including a combination of one HD pixel data y and corresponding n prediction tap data is produced, a total of 6144 (=6×32×32) different SD are sequentially generated by shifting the frame phase to 6 values, the image quality parameter rv associated with the noise reduction to 8 values, the image quality parameter rh associated with the sharpness to 4 values, the vertical spatial phase parameter pv to 8 values, and the horizontal spatial phase parameter ph to 4 values, and learning is performed between the HD signal and each SD signal. The normal equation generator 171 generates a normal equation used to obtain coefficient data $W_i$ (i=1 to n) corresponding to each SD signal for each class. The generated normal equation is supplied to the coefficient data determination unit 172.

The coefficient data determination unit 172 determines the coefficient data $W_i$ corresponding to each SD signal for each class by solving the normal equation supplied from the normal equation generator 171. The resultant coefficient data $W_i$ is supplied to the normal equation generator 173. By using the coefficient data $W_i$ corresponding to each SD signal of each class supplied from the coefficient data determination unit 172, the normal equation generator 173 generates the normal equation in the form of equation (25) used to obtain coefficient seed data $w_{100}$ to $w_{n10}$ for each class and supplies the generated normal equation to the coefficient seed data determination unit 174.

Based on the normal equation generated by the normal equation generator 173 for each class, and the frame phase value t, the noise reduction level rv, the sharpness level rh, the vertical spatial phase pv, and the horizontal spatial phase ph, the coefficient seed data determination unit 174 determines the coefficient seed data $w_{100}$ to $w_{n10}$ for each class by solving the normal equation for each class. The resultant coefficient seed data $w_{100}$ to $w_{n10}$ are stored in the coefficient seed memory 175.

Figure 16:
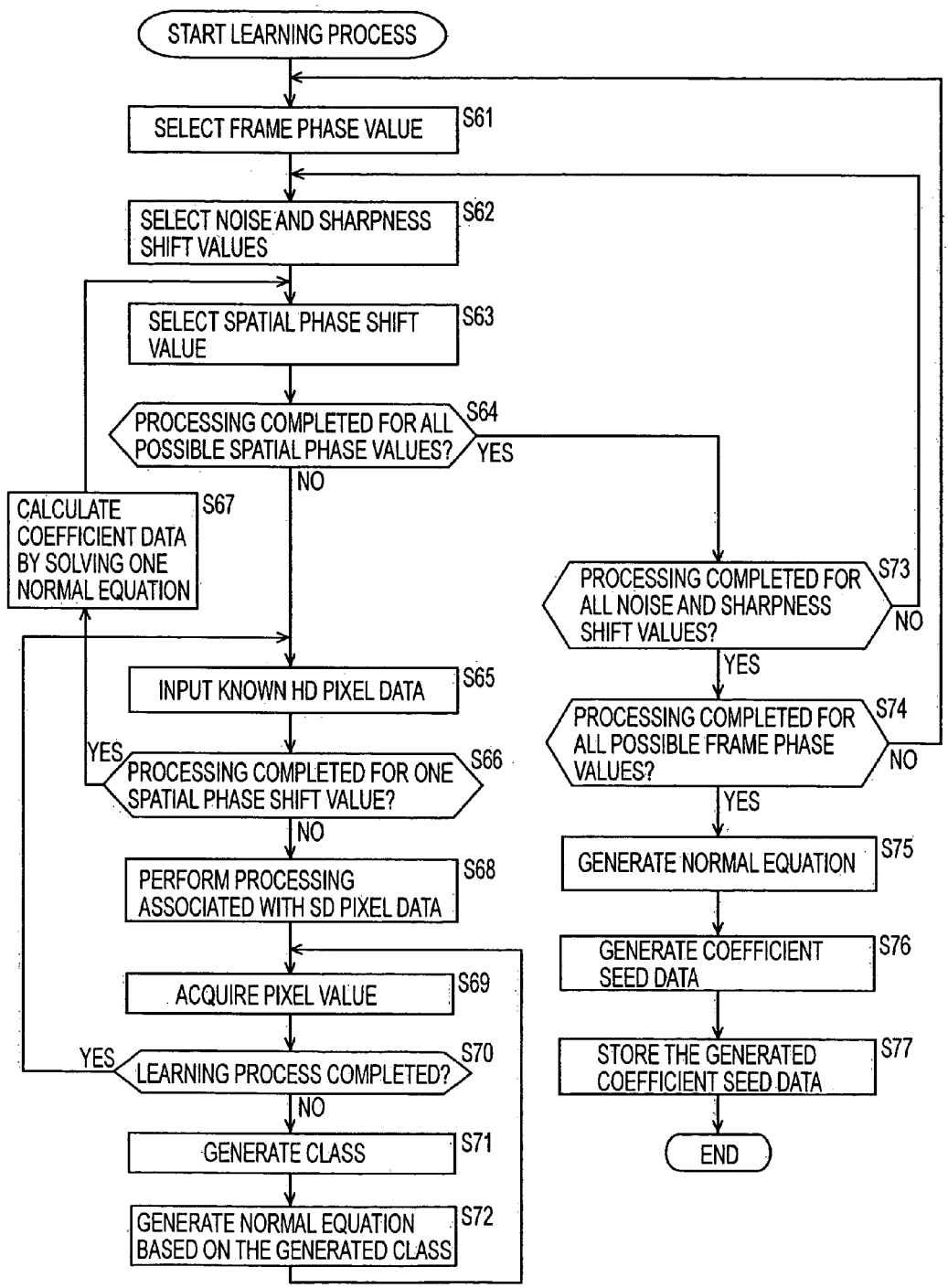
FIG. 16 is a flow chart showing a learning process performed by the coefficient seed data generator shown in FIG. 15.

The operation of the coefficient seed data generator 150 shown in FIG. 15 is described below with reference to a flow chart shown in FIG. 16. In the flow chart shown in FIG. 16, steps S61 to S66, S68 to S71, S73, and S74 are similar to steps S31 to S40, S42, and S43 in the flow chart shown in FIG. 13, and thus they are not described herein again.

In step S72, the normal equation generator 171 generates the normal equation (equation (20)) used to obtain coefficient data $W_i$ (i=1 to n) corresponding to each SD signal generated by the noise/sharpness shifter 154 for each class, based on each HD pixel data y at a location of interest in the HD signal supplied via the input terminal 151, the prediction tap data (SD pixel data) $x_i$ corresponding to the HD pixel data y and selectively extracted by the first tap selector 155, and the class code CL generated by the class combiner 161 for each HD pixel data y.

In step S67, the coefficient data determination unit 172 determines the coefficient data $W_i$ for each class corresponding to each SD signal for a combination of parameters pv and ph associated with spatial phase shifts, by solving the single normal equation generated in step S72.

In step S75, based on the coefficient data $W_i$ of each class corresponding to each SD signal, and the frame phase value t, the noise reduction level rv, the sharpness level rh, the vertical spatial phase pv, and the horizontal spatial phase ph, the normal equation generator 173 generates the normal equation (25) used to acquire the coefficient seed data $w_{100}$ to $w_{n10}$ for each class.

In step S76, the coefficient seed data determination unit 174 determines the coefficient seed data $w_{100}$ to $w_{n10}$ for each class by solving the normal equation generated in step S75. In step S77, the generated coefficient seed data $w_{100}$ to $w_{n10}$ are stored in the coefficient seed memory 175 at an address specified for each corresponding class.

As described above, the coefficient seed data generator 150 shown in FIG. 15 can generate the coefficient seed data $w_{100}$ to $w_{n10}$ of each class to be stored in the information memory bank 137 of the signal processing unit 120 shown in FIG. 2.

Although in the signal processing unit 120 shown in FIG. 1, the generation equation (5) is used to generate the coefficient data $W_i$ (i=1 to n), equation (26) or (27) may be used. A polynomial equation of a degree different from those described above or an equation including other functions may also be used.

$$W_1 = w_{100} + w_{101}(pv) + w_{102}(ph) + w_{103}(rv) + w_{104}(rh) + \quad (26)$$
$$w_{105}(t) + w_{106}(pv)^2 + w_{107}(ph)^2 + w_{108}(rv)^2 +$$
$$w_{109}(rh)^2 + w_{110}(t)^2 + w_{111}(pv)(ph) + w_{112}(pv)(rv) +$$
$$w_{113}(pv)(rh) + w_{114}(pv)(t) + w_{115}(ph)(rv) +$$
$$w_{116}(ph)(rh) + w_{117}(ph)(t) + w_{118}(rv)(rh) + w_{119}(rv)(t) +$$
$$w_{120}(rh)(t)$$

$$W_2 = w_{200} + w_{201}(pv) + w_{202}(ph) + w_{203}(rv) + w_{204}(rh) +$$
$$w_{205}(t) + w_{206}(pv)^2 + w_{207}(ph)^2 + w_{208}(rv)^2 +$$
$$w_{209}(rh)^2 + w_{210}(t)^2 + w_{211}(pv)(ph) + w_{212}(pv)(rv) +$$
$$w_{213}(pv)(rh) + w_{214}(pv)(t) + w_{215}(ph)(rv) +$$
$$w_{216}(ph)(rh) + w_{217}(ph)(t) + w_{218}(rv)(rh) + w_{219}(rv)(t) +$$
$$w_{220}(rh)(t)$$

$\vdots$ $$W_i = w_{i00} + w_{i01}(pv) + w_{i02}(ph) + w_{i03}(rv) + w_{i04}(rh) +$$
$$w_{i05}(t) + w_{i06}(pv)^2 + w_{i07}(ph)^2 + w_{i08}(rv)^2 +$$
$$w_{i09}(rh)^2 + w_{i10}(t)^2 + w_{i11}(pv)(ph) + w_{i12}(pv)(rv) +$$
$$w_{i13}(pv)(rh) + w_{i14}(pv)(t) + w_{i15}(ph)(rv) +$$
$$w_{i16}(ph)(rh) + w_{i17}(ph)(t) + w_{i18}(rv)(rh) + w_{i19}(rv)(t) +$$
$$w_{i20}(rh)(t)$$

$\vdots$ $$W_n = w_{n00} + w_{n01}(pv) + w_{n02}(ph) + w_{n03}(rv) + w_{n04}(rh) +$$
$$w_{n05}(t) + w_{n06}(pv)^2 + w_{n07}(ph)^2 + w_{n08}(rv)^2 +$$
$$w_{n09}(rh)^2 + w_{n10}(t)^2 + w_{n11}(pv)(ph) + w_{n12}(pv)(rv) +$$
$$w_{n13}(pv)(rh) + w_{n14}(pv)(t) + w_{n15}(ph)(rv) +$$
$$w_{n16}(ph)(rh) + w_{n17}(ph)(t) + w_{n18}(rv)(rh) + w_{n19}(rv)(t) +$$
$$w_{n20}(rh)(t)$$

$$W_1 = w_{100} + w_{101}(pv) + w_{102}(ph) + w_{103}(rv) + w_{104}(rh) + \quad (27)$$
$$w_{105}(t) + w_{106}(pv)^2 + w_{107}(ph)^2 + w_{108}(rv)^2 +$$
$$w_{109}(rh)^2 + w_{110}(t)^2 + w_{111}(pv)(ph) + w_{112}(pv)(rv) +$$
$$w_{113}(pv)(rh) + w_{114}(pv)(t) + w_{115}(ph)(rv) +$$
$$w_{116}(ph)(rh) + w_{117}(ph)(t) + w_{118}(rv)(rh) + w_{119}(rv)(t) +$$
$$w_{120}(rh)(t) + w_{121}(pv)^3 + w_{122}(ph)^3 + w_{123}(rv)^3 +$$
$$w_{124}(rh)^3 + w_{125}(t)^3 + w_{126}(pv)^2(ph) + w_{127}(pv)(ph)^2 +$$
$$w_{128}(pv)^2(rv) + w_{129}(pv)(rv)^2 + w_{130}(pv)^2(rh) +$$
$$w_{131}(pv)(rh)^2 + w_{132}(pv)^2(t) + w_{133}(pv)(t)^2 +$$
$$w_{134}(ph)^2(rv) + w_{135}(ph)(rv) + w_{136}(ph)^2(rh) +$$
$$w_{137}(ph)(rh)^2 + w_{138}(ph)^2(t) + w_{139}(ph)(t)^2 +$$
$$w_{140}(rv)^2(rh) + w_{141}(rv)(rh)^2 + w_{142}(rv)^2(t) +$$
$$w_{143}(rv)(t)^2 + w_{144}(rh)^2(t) + w_{145}(rh)(t)^2$$

$$W_2 = w_{200} + w_{201}(pv) + w_{202}(ph) + w_{203}(rv) + w_{204}(rh) +$$
$$w_{205}(t) + w_{206}(pv)^2 + w_{207}(ph)^2 + w_{208}(rv)^2 +$$
$$w_{209}(rh)^2 + w_{210}(t)^2 + w_{211}(pv)(ph) + w_{212}(pv)(rv) +$$
$$w_{213}(pv)(rh) + w_{214}(pv)(t) + w_{215}(ph)(rv) +$$
$$w_{216}(ph)(rh) + w_{21}(7ph)(t) + w_{218}(rv)(rh) +$$
$$w_{219}(rv)(t) + w_{220}(rh)(t) + w_{221}(pv)^3 + w_{222}(ph)^3 +$$
$$w_{223}(rv)^3 + w_{224}(rh)^3 + w_{225}(t)^3 + w_{226}(pv)^2(ph) +$$
$$w_{227}(pv)(ph)^2 + w_{228}(pv)^2(rv) + w_{229}(pv)(rv)^2 +$$
$$w_{230}(pv)^2(rh) + w_{231}(pv)(rh)^2 + w_{232}(pv)^2(t) +$$
$$w_{233}p(v)(t)^2 + w_{234}(ph)^2(rv) + w_{235}(ph)(rv) +$$
$$w_{236}(ph)^2(rh) + w_{237}(ph)(rh)^2 + w_{238}(ph)^2(t) +$$

-continued $$w_{239}(ph)(t)^2 + w_{240}(rv)^2(rh) + w_{241}(rv)(rh)^2 +$$

$$w_{242}(rv)^2(t) + w_{243}(rv)(t)^2 + w_{244}(rh)^2(t) + w_{245}(rh)(t)^2$$

$$\vdots$$

$$W_i = w_{i00} + w_{i01}(pv) + w_{i02}(ph) + w_{i03}(rv) + w_{i04}(rh) +$$

$$w_{i05}(t) + w_{i06}(pv)^2 + w_{i07}(ph)^2 + w_{i08}(rv)^2 +$$

$$w_{i09}(rh)^2 + w_{i10}(t)^2 + w_{i11}(pv)(ph) + w_{i12}(pv)(rv) +$$

$$w_{i13}(pv)(rh) + w_{i14}(pv)(t) + w_{i15}(ph)(rv) +$$

$$w_{i16}(ph)(rh) + w_{i17}(ph)(t) + w_{i18}(rv)(rh) + w_{i19}(rv)(t) +$$

$$w_{i20}(rh)(t) + w_{i21}(pv)^3 + w_{i22}(ph)^3 + w_{i23}(rv)^3 +$$

$$w_{i24}(rh)^3 + w_{i25}(t)^3 + w_{i26}(pv)^2(ph) + w_{i27}(pv)(ph)^2 +$$

$$w_{i28}(pv)^2(rv) + w_{i29}(pv)(rv)^2 + w_{i30}(pv)^2(rh) +$$

$$w_{i31}(pv)(rh)^2 + w_{i32}(pv)^2(t) + w_{i33}(pv)(t)^2 +$$

$$w_{i34}(ph)^2(rv) + w_{i35}(ph)(rv) + w_{i36}(ph)^2(rh) +$$

$$w_{i37}(ph)(rh)^2 + w_{i38}(ph)^2(t) + w_{i39}p(h)(t)^2 +$$

$$w_{i40}(rv)^2(rh) + w_{i41}(rv)(rh)^2 + w_{i42}(rv)^2(t) +$$

$$w_{i43}(rv)(t)^2 + w_{i44}(rh)^2(t) + w_{i45}(rh)(t)^2$$

$$\vdots$$

$$W_n = w_{n00} + w_{n01}(pv) + w_{n02}(ph) + w_{n03}(rv) + w_{n04}(rh) +$$

$$w_{n05}(t) + w_{n06}(pv)^2 + w_{n07}(ph)^2 + w_{n08}(rv)^2 +$$

$$w_{n09}(rh)^2 + w_{n10}(t)^2 + w_{n11}(pv)(ph) + w_{n12}(pv)(rv) +$$

$$w_{n13}(pv)(rh) + w_{n14}(pv)(t) + w_{n15}(ph)(rv) +$$

$$w_{n16}(ph)(rh) + w_{n17}(ph)(t) + w_{n18}(rv)(rh) + w_{n19}(rv)(t) +$$

$$w_{n20}(rh)(t) + w_{n21}(pv)^3 + w_{n22}(ph)^3 + w_{n23}(rv)^3 +$$

$$w_{n24}(rh)^3 + w_{n25}(t)^3 + w_{n26}(pv)^2(ph) + w_{n27}(pv)(ph)^2 +$$

$$w_{n28}(pv)^2(rv) + w_{n29}(pv)(rv)^2 + w_{n30}(pv)^2(rh) +$$

$$w_{n31}(pv)(rh)^2 + w_{n32}(pv)^2(t) + w_{n33}(pv)(t)^2 +$$

$$w_{n34}(ph)^2(rv) + w_{n35}(ph)^2(rv) + w_{n36}(ph)^2(rh) +$$

$$w_{n37}(ph)(rh)^2 + w_{n38}p(h)^2(t) + w_{n39}(ph)(t)^2 +$$

$$w_{n40}(rv)^2(rh) + w_{n41}(rv)(rh)^2 + w_{n42}(rv)^2(t) +$$

$$w_{n43}(rv)(t)^2 + w_{n44}(rh)^2(t) + w_{n45}(rh)(t)^2$$

Although in the embodiments described above, a linear equation is used as the prediction equation to generate the HD signal, other equations such as an equation of higher degree may also be used.

Furthermore, although in the embodiments described above, a class code CL is detected and coefficient data $W_i$ corresponding to this class code CL is used in the prediction process, the detection of the class code CL is not necessarily needed. In the case in which the detection of the class code CL is not performed, only one set of coefficient set data is stored in the information memory bank 137.

Furthermore, although in the embodiments described above, the output image signal Vout output from the signal processing unit 120 is supplied to the display 2 and an image is displayed on the display 2 in accordance with the output image signal Vout, the output image signal Vout may be supplied to a recording apparatus such as a video tape recorder. In this case, the pose processor 131 may convert the output image signal Vout into a format optimized for recording.

Furthermore, although in the embodiments described above, a 525i signal given as the input image signal Vin is converted to the output image signal Vout in the form of a 1080i signal, a XGA signal, or a zoomed-up/down 525i signal, the present invention is not limited to such a conversion. The present invention may also be applied to a general conversion using a prediction equation from a first image signal to a second image signal.

Furthermore, the information signal is not limited to an image signal. The present invention may also be applied to other types of information signals such as an audio signal.

In the present invention, as described above, when a first information signal is converted to a second information signal, coefficient data of a prediction equation is generated from coefficient seed data based on phase information of a point of interest of the second information signal depending on format or size conversion mode specified by conversion information. Using the coefficient data, information data of the point of interest of the second information signal. When the second information signal is played back at a different playback speed from the playback speed of the original first information signal, new frames are generated based on frame phase values such that the second information signal is smoothly played back. Thus, according to the present invention, the format and/or the size can be converted and the resultant converted image can be displayed smoothly event at a playback speed different from the original playback speed. A great number of coefficient data can be generated from a small number of coefficient seed data stored in a memory, and thus a coefficient memory does not need to have a large storage capacity. This allows a reduction in total cost of the apparatus.

Furthermore, in the present invention, the sum of the coefficients of the prediction equation generated using the coefficient seed data is determined, and the information data of a point of interest generated using the prediction equation is normalized by dividing the information data by the sum. The normalization of the information data eliminates a fluctuation of the level of the point of interest due to a rounding error that occurs when the coefficient data is determined from the coefficient seed data using the generation equation.

Furthermore, in the present invention, a sequence of motion images including a scene of interest can be played back such that the image is zoomed in at the center of a point interest. The zoomed-in image can be displayed with high image quality and can be smoothly played back even at a specified arbitrary playback speed.

The sequence of processing steps described above may be performed by means of hardware or software. When the processing sequence is executed by software, a program forming the software may be installed from a storage medium or via a network onto a computer which is provided as dedicated hardware or may be installed onto a general-purpose computer capable of performing various processes in accordance with various programs installed thereon.

FIG. 17 shows an example of a configuration of a personal computer on which the signal processing unit 120 shown in FIG. 2 and/or the coefficient seed data generator 150 shown in FIG. 12 or 15 are implemented by means of software. A CPU 201 of the personal computer controls operations of all parts of the personal computer. If a command is issued by a user via an input unit 206 including a keyboard and a mouse, the command is transferred to the CPU 201 via an input/output interface 205 and a bus 204. In response to the command, the CPU 201 executes a program stored in a ROM (Read Only Memory) 202. A program may also be installed in a storage unit 208 from a magnetic disk 221, an optical disk 222, a magnetooptical disk 223, or a semiconductor memory 224 connected to a drive 210. In this case, the CPU 201 loads the program in a RAM (Random Access Memory) 203 from the storage unit 208 and executes the program. Thus, the functions of the signal processing unit 120 shown in FIG. 2 and/or the coefficient seed data generator 150 shown in FIG. 12 or 15 are implemented by means of software. The CPU 201 also communicate with an external device via a communication unit 209 to transmit/receive data.

Specific examples of storage media usable for storing the program include, as shown in FIG. 17, a magnetic disk 221 (such as a floppy disk), an optical disk 222 (such as a CD-ROM (Compact Disk-Read Only Memory) and a DVD (Digital Versatile Disk)), a magnetooptical disk 223 (such as a MD (Mini-Disk, trademark)), and a semiconductor memory 224, in the form of a package medium in which the program is stored and which is supplied to a user separately from a computer. The program may also be supplied to a user by preinstalling it on a built-in ROM 202 or a storage unit 208 such as a hard disk disposed in the computer.

In the present description, the steps described in the program stored in the storage medium may be performed either in time sequence in accordance with the order described in the program or in a parallel or separate fashion.

Note that in the present description, the term "system" is used to describe a set of a plurality of apparatuses as a whole.

The present application contains subject matter related to Japanese patent application no. 2003-397191, filed in Japanese Patent Office on Nov. 27, 2003, the entire contents of which being incorporated herein by reference.

What is claimed is:

1. A signal processing apparatus for converting a first image signal into a second image signal, comprising:
   storage means for storing a predetermined number of newest frames of the first image signal being input;
   playback speed setting means for setting a playback speed of the first image signal stored in the storage means;
   frame phase calculation means for calculating a frame phase of the second image signal relative to the first image signal, based on the playback speed;
   spatial parameter setting means for setting a spatial parameter indicating a spatial phase of the second image signal relative to the first image signal;
   image quality parameter setting means for setting an image quality parameter indicating the degree of image quality adjustment made on the first image signal to obtain the second image signal;
   classification means for classifying the second image signal into one of a plurality of classes, depending on a level distribution of the first image signal;
   tap coefficient output means for outputting, for each class, tap coefficients acquired via learning based on the frame phase, the spatial parameter, and the image quality parameter; and
   calculation means for determining the second image signal by performing a calculation using the first image signal and the tap coefficients of the class determined by the classification means.

2. A signal processing apparatus according to claim 1, further comprising range setting means for setting a range of the first image signal stored in the storage means to be converted into the second image signal.

3. A signal processing apparatus according to claim 1,
   wherein the spatial phase includes a horizontal spatial phase and a vertical spatial phase; and
   the spatial parameter includes a horizontal spatial phase parameter corresponding to the horizontal spatial phase and a vertical spatial phase parameter corresponding to the vertical spatial phase.

4. A signal processing apparatus according to claim 1,
   wherein the image quality includes a sharpness level and a noise level; and
   the image quality parameters include a sharpness parameter associated with the sharpness level and a noise parameter associated with the noise level.

5. A signal processing method, for a signal processing apparatus for converting a first image signal into a second image signal, comprising the steps of:
   storing a predetermined number of newest frames of the first image signal being input;
   setting a playback speed of the first image signal stored in the storage step;
   calculating a frame phase of a second image signal relative to the first image signal, based on the playback speed;
   setting a spatial parameter indicating a spatial phase of the second image signal relative to the first image signal;
   setting an image quality parameter indicating the degree of image quality adjustment made on the first image signal to obtain the second image signal;
   classifying the second image signal into one of a plurality of classes, depending on a level distribution of the first image signal;
   outputting, for each class, tap coefficients acquired via learning based on the frame phase, the spatial parameter, and the image quality parameter; and
   determining the second image signal by performing a calculation using the first image signal and the tap coefficients of the class determined in the classification step.

6. A computer-storage medium storing an encoded program for controlling a signal processing apparatus for converting a first image signal into a second image signal, the program comprising the steps of:
   storing a predetermined number of newest frames of the first image signal being input;
   setting a playback speed of the first image signal stored in the storage step;
   calculating a frame phase of a second image signal relative to the first image signal, based on the playback speed;
   setting a spatial parameter indicating a spatial phase of the second image signal relative to the first image signal;
   setting an image quality parameter indicating the degree of image quality adjustment made on the first image signal to obtain the second image signal;
   classifying the second image signal into one of a plurality of classes, depending on a level distribution of the first image signal;
   outputting, for each class, tap coefficients acquired via learning based on the frame phase, the spatial parameter, and the image quality parameter; and
   determining the second image signal by performing a calculation using the first image signal and the tap coefficients of the class determined in the classification step.

7. A signal processing apparatus for converting a first image signal into a second image signal, comprising:
   a storage unit configured to store a predetermined number of newest frames of the first image signal being input;

a playback speed setting unit configured to set a playback speed of the first image signal stored in the storage means;

a frame phase calculation unit configured to calculate a frame phase of a second image signal relative to the first image signal, based on the playback speed;

a spatial parameter setting unit configured to set a spatial parameter indicating a spatial phase of the second image signal relative to the first image signal;

an image quality parameter setting unit configured to set an image quality parameter indicating the degree of image quality adjustment made on the first image signal to obtain the second image signal;

a classification unit configured to classify the second image signal into one of a plurality of classes, depending on a level distribution of the first image signal;

a tap coefficient output unit configured to output, for each class, tap coefficients acquired via learning based on the frame phase, the spatial parameter, and the image quality parameter; and a calculation unit configured to determine the second image signal by performing a calculation using the first image signal and the tap coefficient of the class determined by the classification unit.

8. A signal processing apparatus for converting a first image signal into a second image signal, comprising:

storage means for storing a predetermined number of newest frames of the first image signal being input;

playback speed setting means for setting a playback speed of the first image signal stored in the storage means;

frame phase calculation means for calculating a frame phase of the second image signal relative to the first image signal, based on the playback speed;

classification means for classifying the second image signal into one of a plurality of classes, depending on a level distribution of the first image signal;

tap coefficient output means for outputting, for each class, tap coefficients acquired via learning based on the frame phase; and calculation means for determining the second image signal by performing a calculation using the first image signal and the tap coefficients of the class determined by the classification means.

9. A signal processing method, for a signal processing apparatus for converting a first image signal into a second image signal, comprising the steps of:

storing a predetermined number of newest frames of the first image signal being input;

setting a playback speed of the first image signal stored in the storage step;

calculating a frame phase of a second image signal relative to the first image signal, based on the playback speed;

classifying the second image signal into one of a plurality of classes, depending on a level distribution of the first image signal;

outputting, for each class, tap coefficients acquired via learning based on the frame phase; and determining the second image signal by performing a calculation using the first image signal and the tap coefficients of the class determined in the classification step.

10. A computer-storage medium storing an encoded program for controlling a signal processing apparatus for converting a first image signal into a second image signal, the program comprising the steps of:

storing a predetermined number of newest frames of the first image signal being input;

setting a playback speed of the first image signal stored in the storage step;

calculating a frame phase of a second image signal relative to the first image signal, based on the playback speed;

classifying the second image signal into one of a plurality of classes, depending on a level distribution of the first image signal;

outputting, for each class, tap coefficients acquired via learning based on the frame phase; and determining the second image signal by performing a calculation using the first image signal and the tap coefficients of the class determined in the classification step.

11. A signal processing apparatus for converting a first image signal into a second image signal, comprising:

a storage unit configured to store a predetermined number of newest frames of the first image signal being input;

a playback speed setting unit configured to set a playback speed of the first image signal stored in the storage means;

a frame phase calculation unit configured to calculate a frame phase of a second image signal relative to the first image signal, based on the playback speed;

a classification unit configured to classify the second image signal into one of a plurality of classes, depending on a level distribution of the first image signal;

a tap coefficient output unit configured to output, for each class, tap coefficients acquired via learning based on the frame phase; and a calculation unit configured to determine the second image signal by performing a calculation using the first image signal and the tap coefficient of the class determined by the classification unit.

* * * * *